(12) United States Patent  
Lai

(10) Patent No.: US 7,401,803 B1  
(45) Date of Patent: Jul. 22, 2008

(54) STROLLER

(76) Inventor: Chin-I Lai, No. 96, Zhengbei 1st Rd., Yongkang City, Tainan County (TW)

( * ) Notice: Subject to any disclaimer, the term of this patent is extended or adjusted under 35 U.S.C. 154(b) by 0 days.

(21) Appl. No.: 11/895,855

(22) Filed: Aug. 28, 2007

(51) Int. Cl.  
B62B 7/06 (2006.01)

(52) U.S. Cl. ........................ 280/647; 280/642; 280/643; 280/648; 280/650; 280/47.38

(58) Field of Classification Search ................. 280/642, 280/643, 647, 648, 650, 47.38  
See application file for complete search history.

(56) References Cited

U.S. PATENT DOCUMENTS

| | | | | |
|---|---|---|---|---|
| 5,938,229 | A * | 8/1999 | Chen et al. ................... | 280/642 |
| 5,988,670 | A * | 11/1999 | Song et al. ................... | 280/648 |
| 2003/0201625 | A1* | 10/2003 | Espenshade et al. ......... | 280/642 |
| 2005/0006879 | A1* | 1/2005 | Chen ........................... | 280/647 |
| 2005/0121871 | A1* | 6/2005 | Arai et al. ................. | 280/47.38 |
| 2005/0258620 | A1* | 11/2005 | Pike et al. .................... | 280/647 |
| 2006/0071452 | A1* | 4/2006 | Yeh ............................. | 280/642 |
| 2006/0163847 | A1* | 7/2006 | Hartenstine et al. ......... | 280/642 |
| 2007/0045975 | A1* | 3/2007 | Yang ........................ | 280/47.38 |
| 2007/0052208 | A1* | 3/2007 | Chen et al. .................. | 280/642 |
| 2007/0262566 | A1* | 11/2007 | Hartenstine et al. ......... | 280/642 |
| 2008/0029983 | A1* | 2/2008 | Yang ........................ | 280/47.38 |
| 2008/0042383 | A1* | 2/2008 | Hu ........................... | 280/47.38 |

* cited by examiner

*Primary Examiner*—Christopher Ellis  
*Assistant Examiner*—Jacob Meyer  
(74) *Attorney, Agent, or Firm*—Frenkel & Associates, P.C.

(57) ABSTRACT

A stroller mainly includes an upper rack, a front wheel rack, a rear wheel rack, an arched rib, a connection bar, a bracing bar, a guarding handle, a plurality of rotary joints and a plurality of corresponding bars. It also has a folding means consisting of the rear wheel rack, arched rib, second, third and fourth rotary joints, a direction switch and wheel retraction means consisting of the front wheel rack, arched rib, second, third and fourth rotary joints, a brake means consisting of brake pulling bar assembly, a plurality of brake means and a cable, and a seat assembly consisting of a cross coupling hub, a guarding handle, a seat rack and a first rotary joint. The second rotary joint is slidable on the rear wheel rack. The fourth rotary joint is slidable on the arched rib.

16 Claims, 29 Drawing Sheets

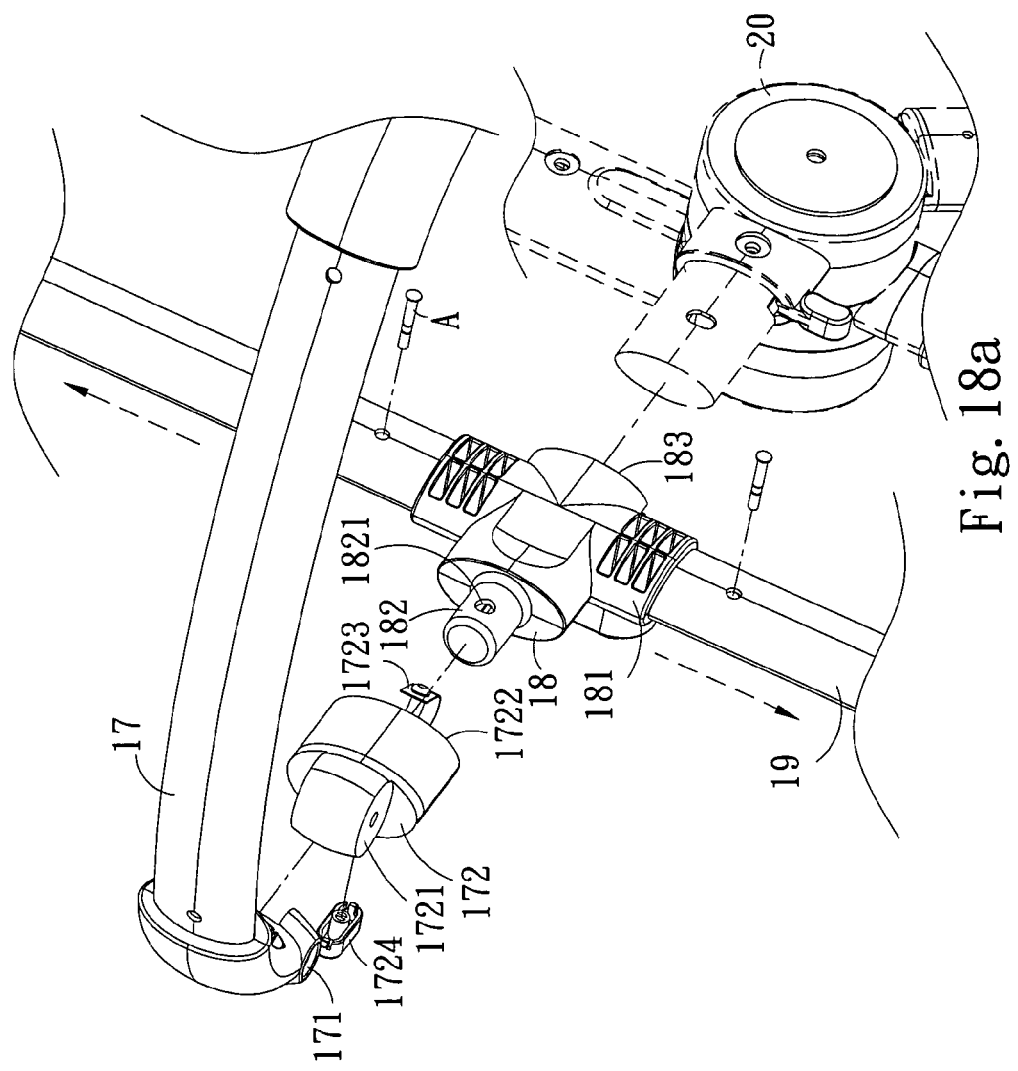

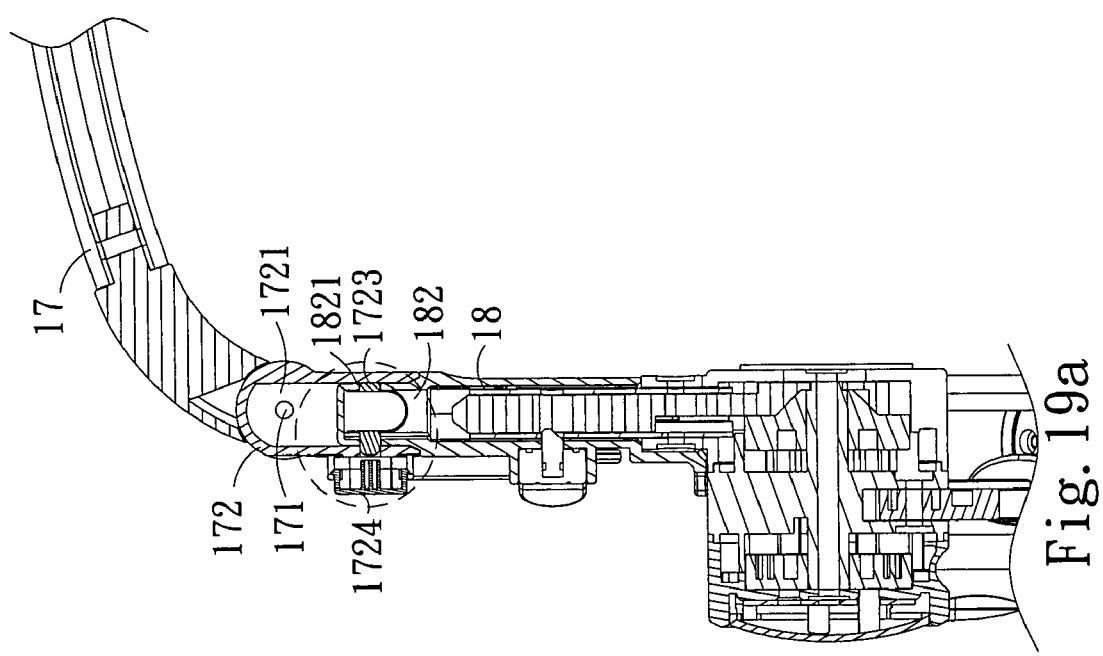

STROLLER

FIELD OF THE INVENTION

The present invention relates to a stroller and particularly to a stroller that can be easily folded and used with less effort.

BACKGROUND OF THE INVENTION

Conventional strollers have many problems in use, such as involving complicated operations during folding. Use and storing also are troublesome.

Some conventional strollers have a direction switching mechanism. When such a feature is in use, the direction of the handle alters, and the position of the front and rear wheels are switched. It is not always in a balanced and coordinated condition. There is also no mechanism to retract the front wheels.

Moreover, for the stroller equipped with a brake means, it is located close to the wheel. When in use the brake means has to be stepped by user's foot or pulled by user's hand in a stooped condition. It is not a smooth and streamline operation.

The seat structure of the conventional strollers also has drawbacks, notably:

1. The seat assembly of the conventional stroller aims to provide a more comfortable space for a baby, thus it has a larger frame. It often is not foldable and takes a lot of space.

2. The seat assembly of the conventional stroller has a safety means on the backrest that adopts a safety band and a latch buckle. It is more difficult to use. The safety band is not sturdy and easily breaks. It still leaves a lot to be desired in terms of safety effect.

SUMMARY OF THE INVENTION

The present invention aims to provide a stroller that is easy to use, safer and labor saving.

To achieve the foregoing object, the stroller of the invention mainly includes an upper rack, a front wheel rack, a rear wheel rack, an arched rib, a connection bar, a bracing bar, a guarding handle, a sliding sleeve assembly, a cross coupling hub, a seat rack and a plurality of rotary joints. Except the upper rack and the guarding handle, all other main elements are symmetrical left and right. When in use the main structure can be divided into a folding means, a direction switch and wheel retraction means, a brake means and a seat assembly. The folding means includes the sliding sleeve assembly, upper rack, bracing bar, rear wheel rack, arched rib and second, third and fourth rotary joints. The direction switch and wheel retraction means include the front wheel rack, arched rib and second, third and fourth rotary joints. The brake means includes a brake pulling bar assembly, a latch member, a sliding seat, a bucking strut, a brake gear, a sync bar, a plurality of fastening elements and a cable. The seat assembly includes the cross coupling hub, guarding handle, seat rack and a first rotary joint. The cable may be a flexible wire or a rigid wire. The fastening elements may be rivets or screws.

In one aspect, the sliding sleeve assembly includes a sliding sleeve, a sliding latch member, a rotation latch member, a return strut, a cable and a plurality of elastic elements. The first rotary joint includes a first joint guarding cap, a first joint front cap, a cross latch member, a first joint holding member, a gear, a first joint rear cap, a pulling bar, and a plurality of elastic elements. The second rotary joint includes a second joint sliding member, a second joint turning member, a second joint coupling member and a plurality of elastic elements. The third rotary joint includes a third joint front cap and a third joint holding member. The fourth rotary joint includes a fourth joint sliding member, a fourth joint cap round and a fourth joint anchor knob.

The foregoing, as well as additional objects, features and advantages of the invention will be more readily apparent from the following detailed description, which proceeds with reference to the accompanying drawings. The embodiments discussed below serve only for illustrative purpose, and are not the limitation of the invention.

BRIEF DESCRIPTION OF THE DRAWINGS

FIG. 18a is an exploded view of the seat assembly of the invention.

FIG. 19a is a cross-sectional view of the seat assembly of the invention in operating condition-1.

DETAILED DESCRIPTION OF THE PREFERRED EMBODIMENT

Figure 1:
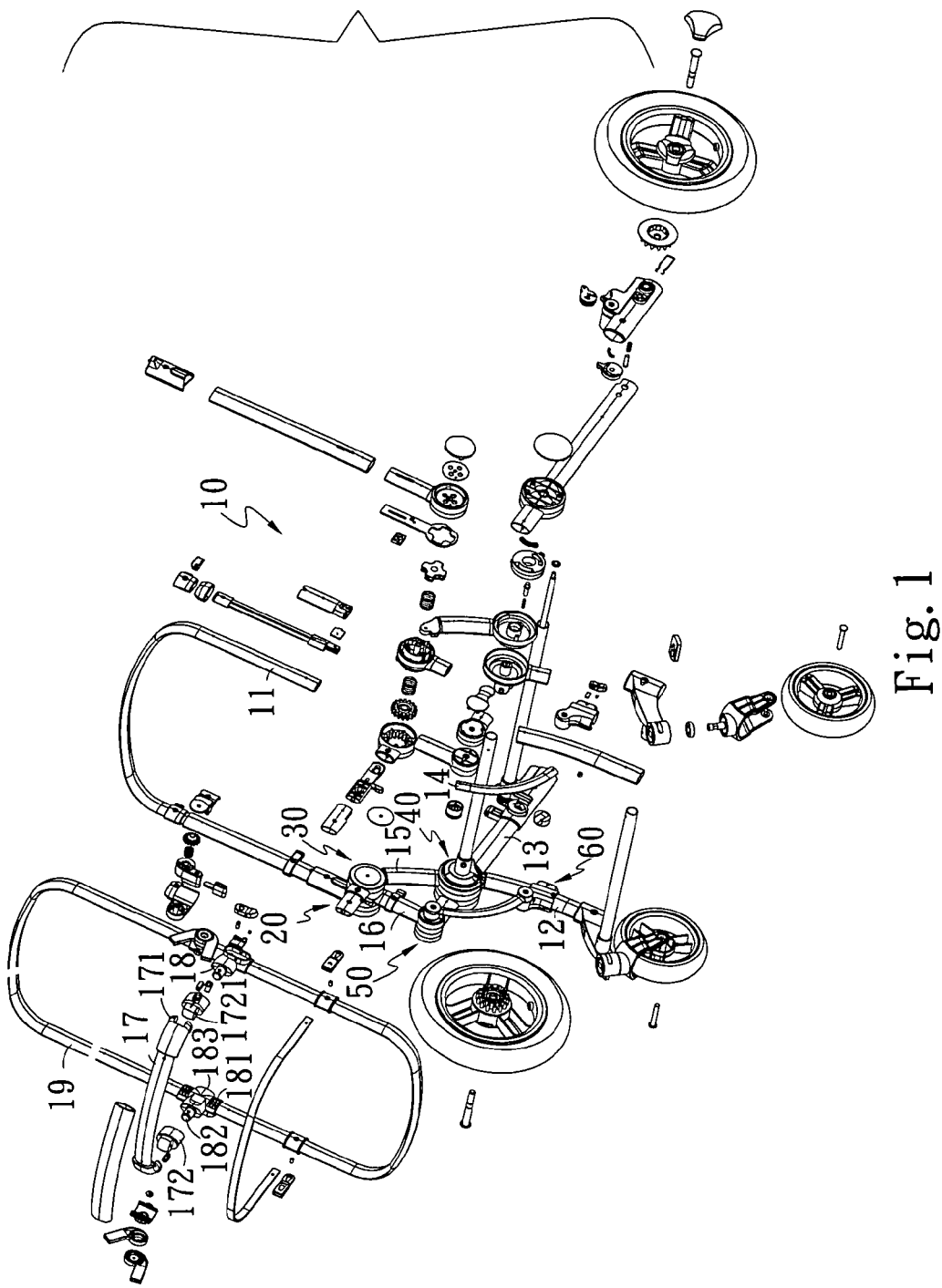
FIG. 1 is an exploded view of the invention.
Figure 2:
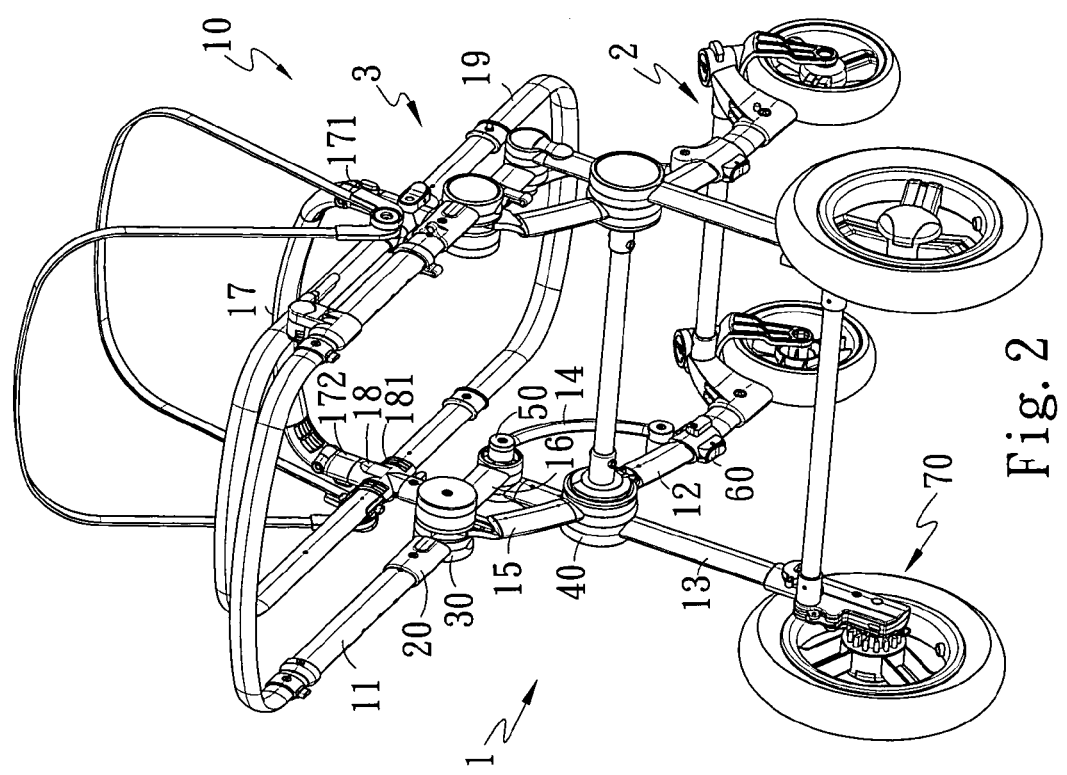
FIG. 2 is a perspective view of the invention.
Figure 18B:
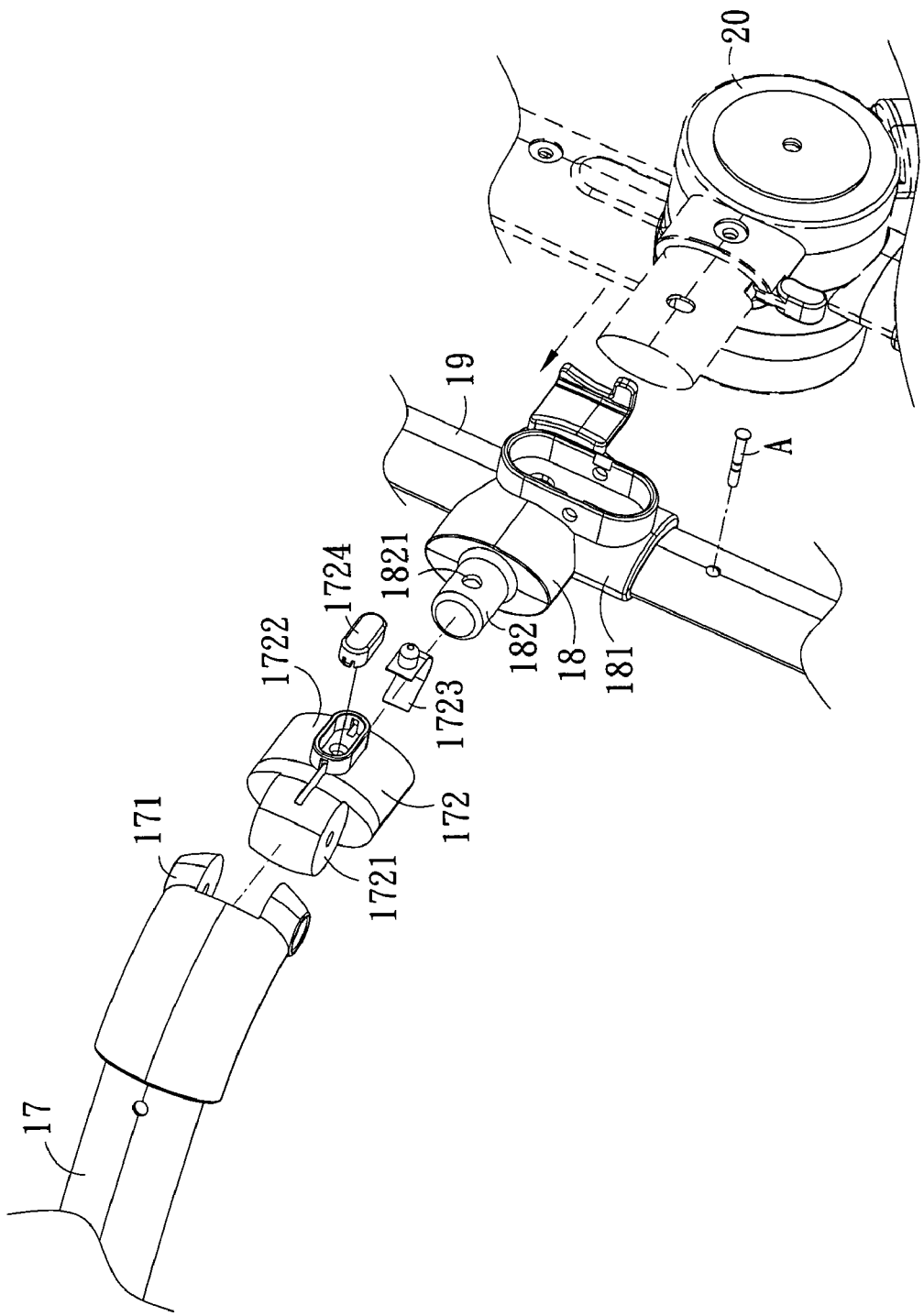
FIG. 18b is another exploded view of the seat assembly of the invention.
Figure 19B:
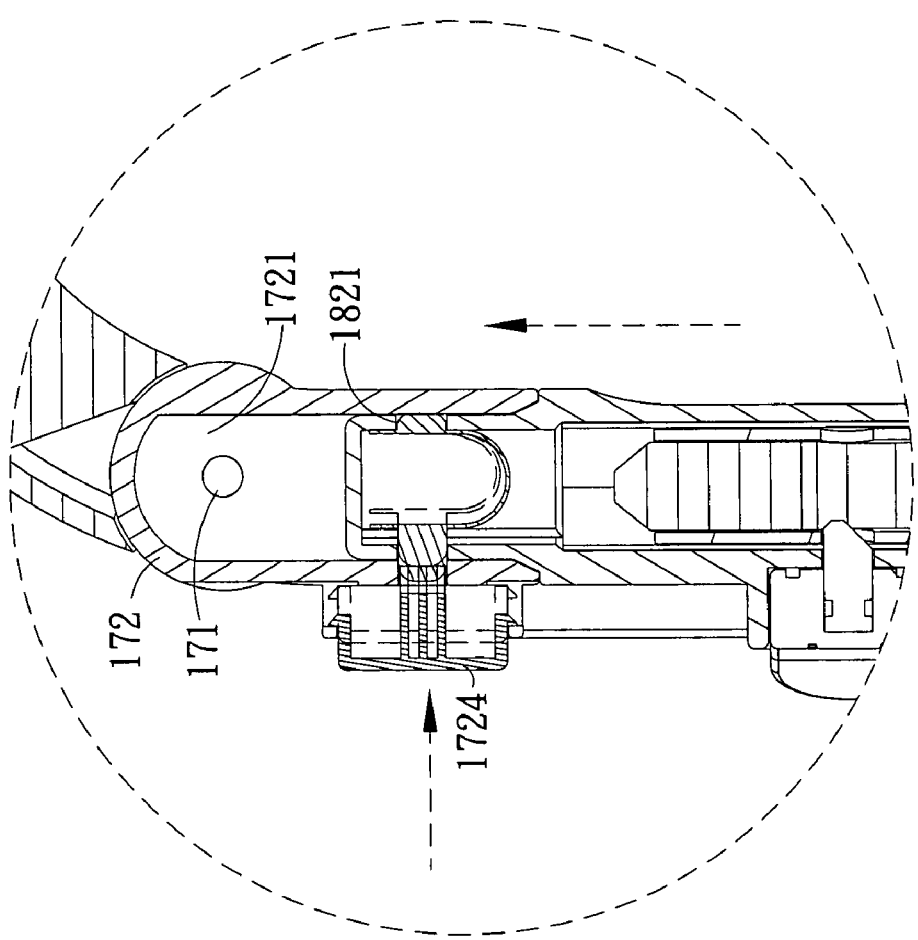
FIG. 19b is a cross-sectional view of the seat assembly of the invention in operating condition-2.
Figure 19C:
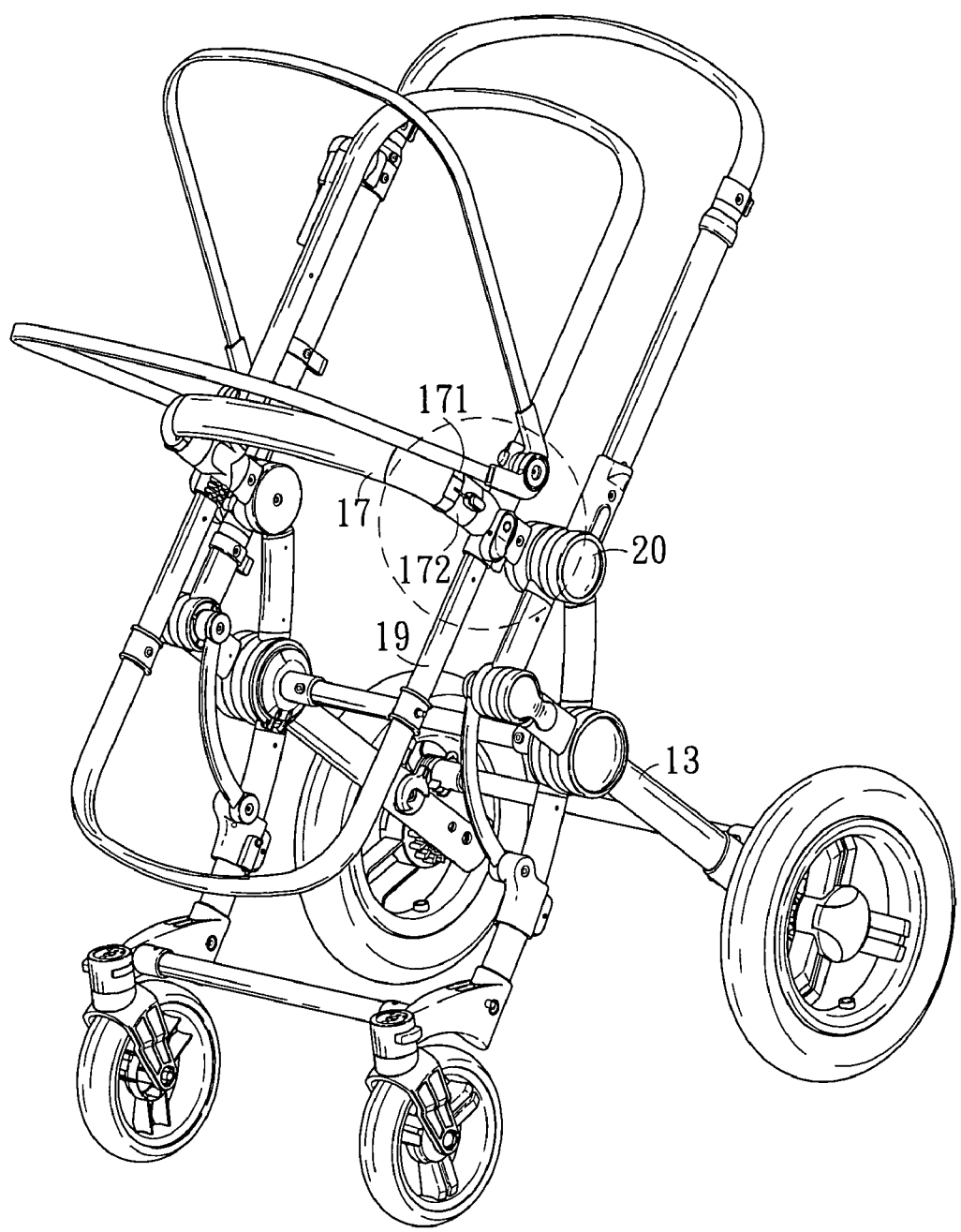
FIG. 19c is a perspective view of the seat assembly of the invention in operating condition-3.
Figure 19D:
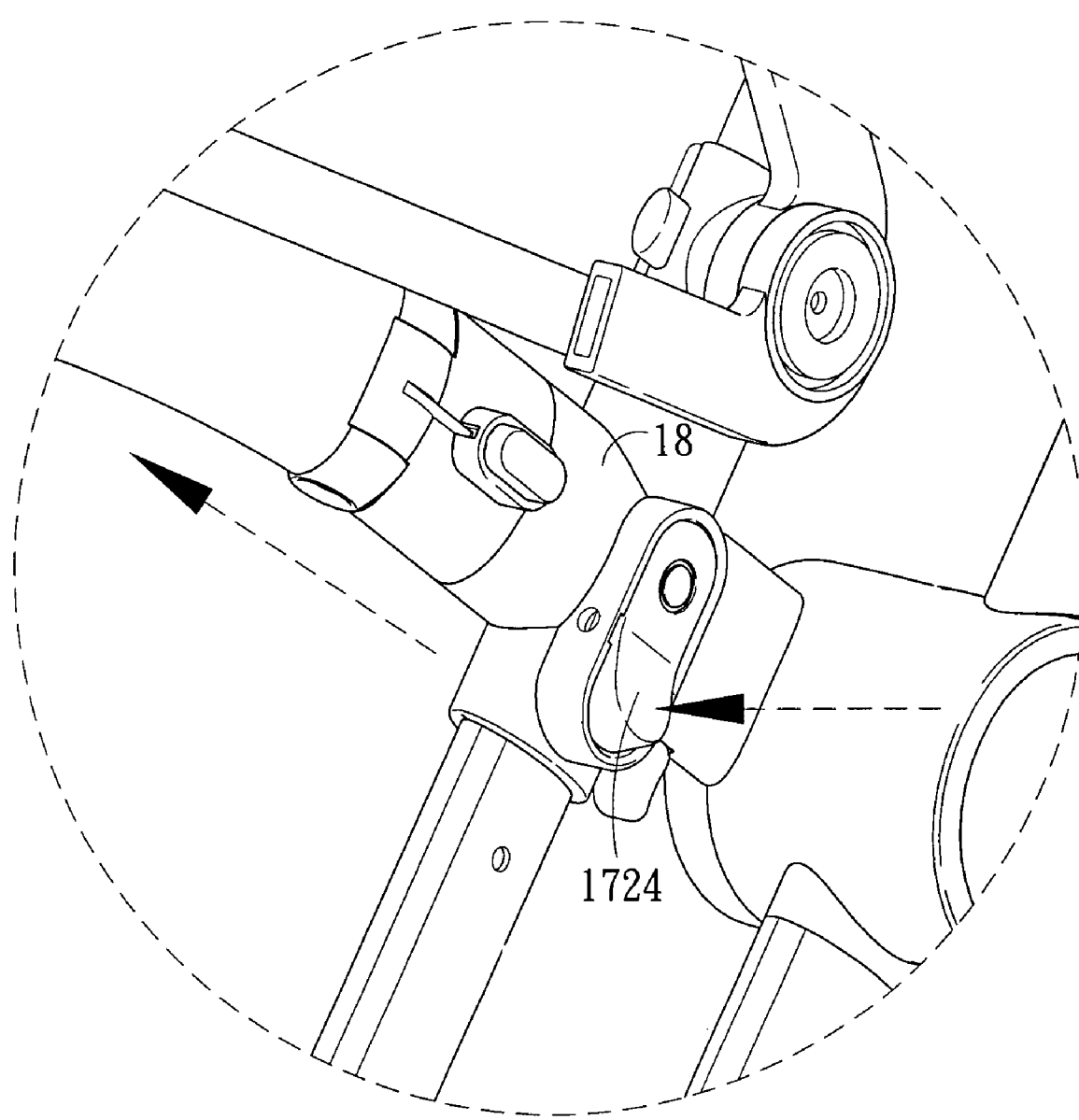
FIG. 19d is a schematic view of the seat assembly of the invention in operating condition-4.

Please refer to FIGS. 1 and 2, the stroller of the invention mainly includes an upper rack 11, a rear wheel rack 12, a front wheel rack 13, an arched rib 14, a connection bar 15, a bracing bar 16, a guarding handle 17, a sliding sleeve assembly 20, a cross coupling hub 18, a seat rack 19 and a plurality of rotary joints 30, 40, 50 and 60. Except the upper rack 11 and the guarding handle 17, all other main elements are symmetrical left and right. Also referring to FIG. 18a, the cross coupling hub 18 has seat coupling struts 181 at two sides to hold the seat rack 19, and a round post 182 to wedge in the guarding handle 17. The round post 182 has a fastening hole 1821 and an insertion cavity 183 at the bottom. Referring to FIG. 18b, the guarding handle 17 has an axle 171 and an insertion member 172 at each of two sides. The insertion member 172 has a turning portion 1721 corresponding to the axle 171, and a wedge cavity 1722 and an elastic reed 1723 at an inner side thereof. The insertion member 172 further has a pushbutton 1724 on another side.

Referring to FIG. 2, the upper rack 11 has two ends coupled respectively with the first rotary joint 30 and the sliding sleeve assembly 20. The first rotary joint 30 is connected to one end of the bracing bar 16 and the connection bar 15. The connection bar 15 has other end connecting to the second rotary joint 40 which can rotate and slide on the front wheel rack 13. The bracing bar 16 has other end connecting to the turnable third rotary joint 50. The front wheel rack 13 has one side connecting to front wheels and another side connecting to the third rotary joint 50. The rear wheel rack 12 has one side connecting to rear wheels and another side connecting to the second rotary joint 40. The arched rib 14 has one side connecting to the third rotary joint 50 and another side connecting to the four rotary joint 60 which can rotate and slide on the rear wheel rack 12. The sliding sleeve assembly 20 is located at two sides of the upper rack 11. The cross coupling hub 18 is inserted in the first rotary joint 30.

In practice, the stroller of the invention can be divided into a folding means 1, a direction switch and wheel retraction means 2, a brake means 70 and a seat assembly 3. The folding means 1 consists of the sliding sleeve assembly 20, upper rack 11, bracing bar 16, rear wheel rack 12, arched rib 14, and second, third and fourth rotary joints 40, 50 and 60. The direction switch and wheel retraction means 2 consists of the arched rib 14 and second, third and fourth rotary joints 40, 50 and 60. The brake means 70 consists of a brake pulling bar assembly 71, a latch member 72, a sliding seat 73, a bucking strut 74, a brake gear 75, a sync bar 76, a plurality of fastening elements A and a cable C. The seat assembly 3 consists of the cross coupling hub 18, guarding handle 17, seat rack 19 and first rotary joint 30. The cable C may be a flexible wire or rigid wire. The fastening elements A may be rivets or screws.

Figure 3:
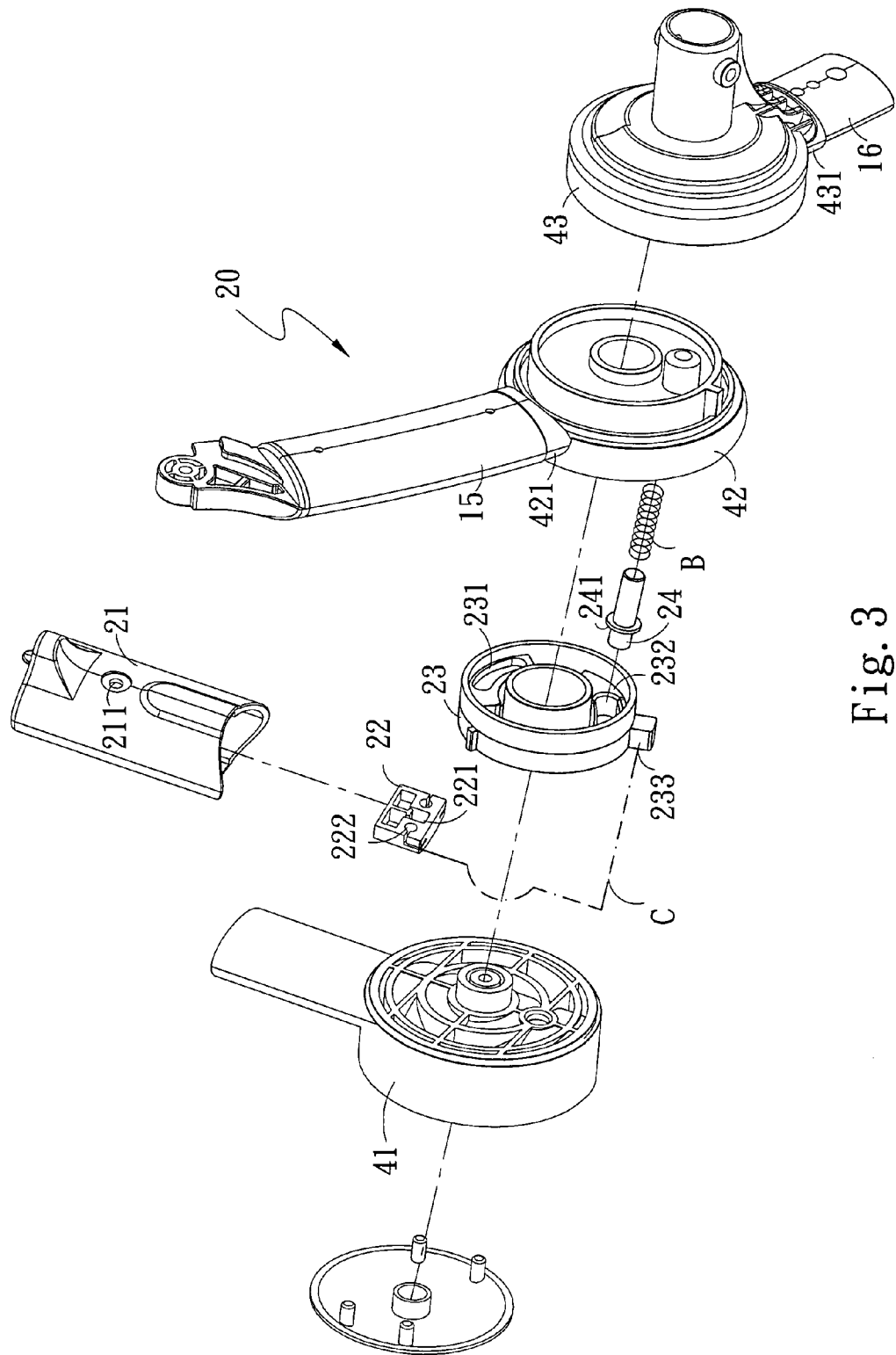
FIG. 3 is an exploded view of the sliding sleeve assembly of the invention.
Figure 4:
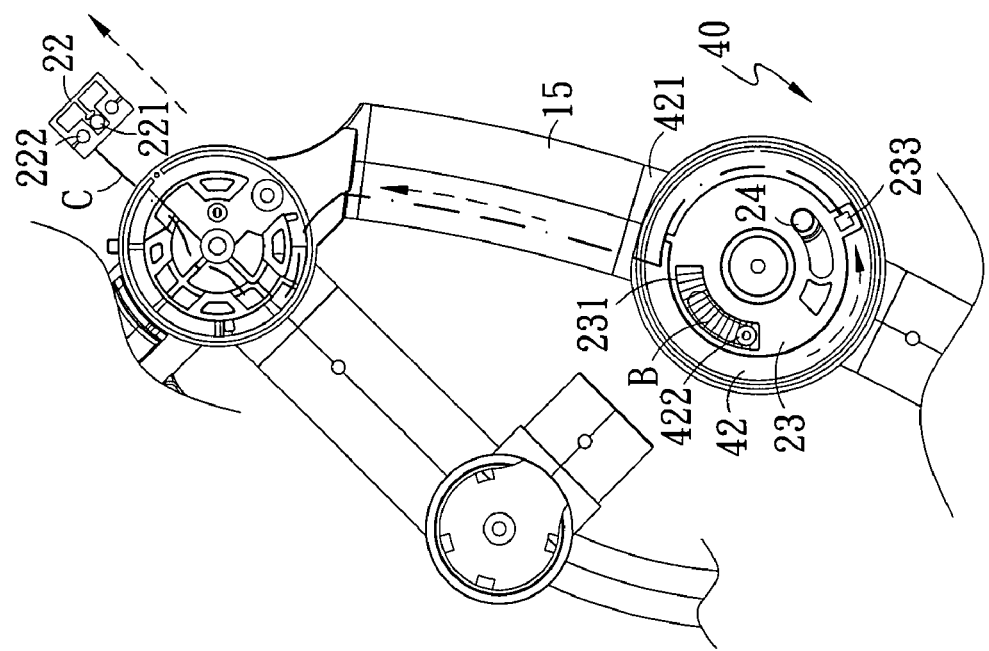
FIG. 4 is a plan view of the invention showing an operating condition of the sliding sleeve assembly in the second joint.

Referring to FIG. 3, the sliding sleeve assembly 20 includes a sliding sleeve 21, a sliding latch member 22, a rotary latch member 23, a return strut 24, the cable C and an elastic element B. The sliding sleeve 21 has a pin 211 to be inserted into the sliding latch member 22 so that the sliding sleeve 21 and the sliding latch member 22 can slide at the same time. The sliding latch member 22 has an aperture 221 corresponding to the pin 211 on the sliding sleeve 21, and a first anchor trough 222 to fasten one side of the cable C. The rotary latch member 23 has a slot 231 and a first slope surface 232 to allow the return strut 24 to be moved on an inner side of the rotary latch member 23, and a second anchor trough 233 to fasten other side of the cable C. The return strut 24 has a plane 241 to hold an inner side of the rotary latch member 23. The rotary latch member 23 and the return strut 24 are located in the second rotary joint 40.

Figure 5A:
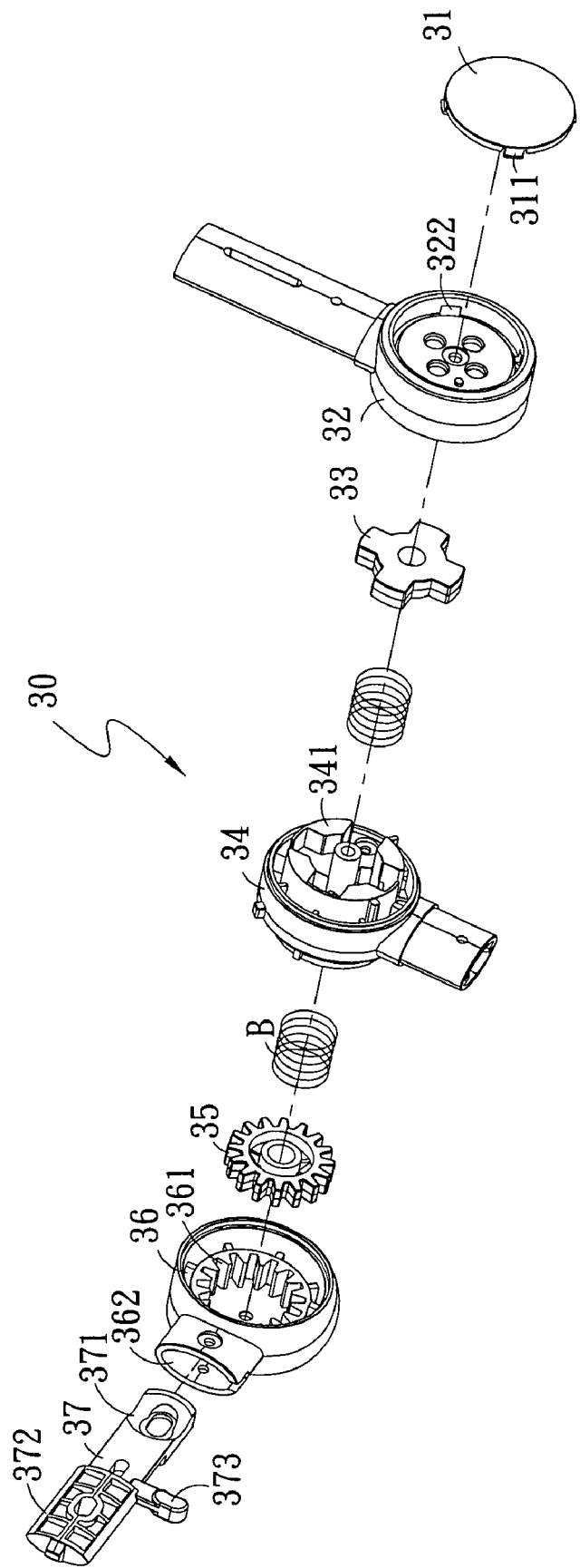
FIG. 5a is an exploded view of the first rotary joint of the invention.
Figure 5B:
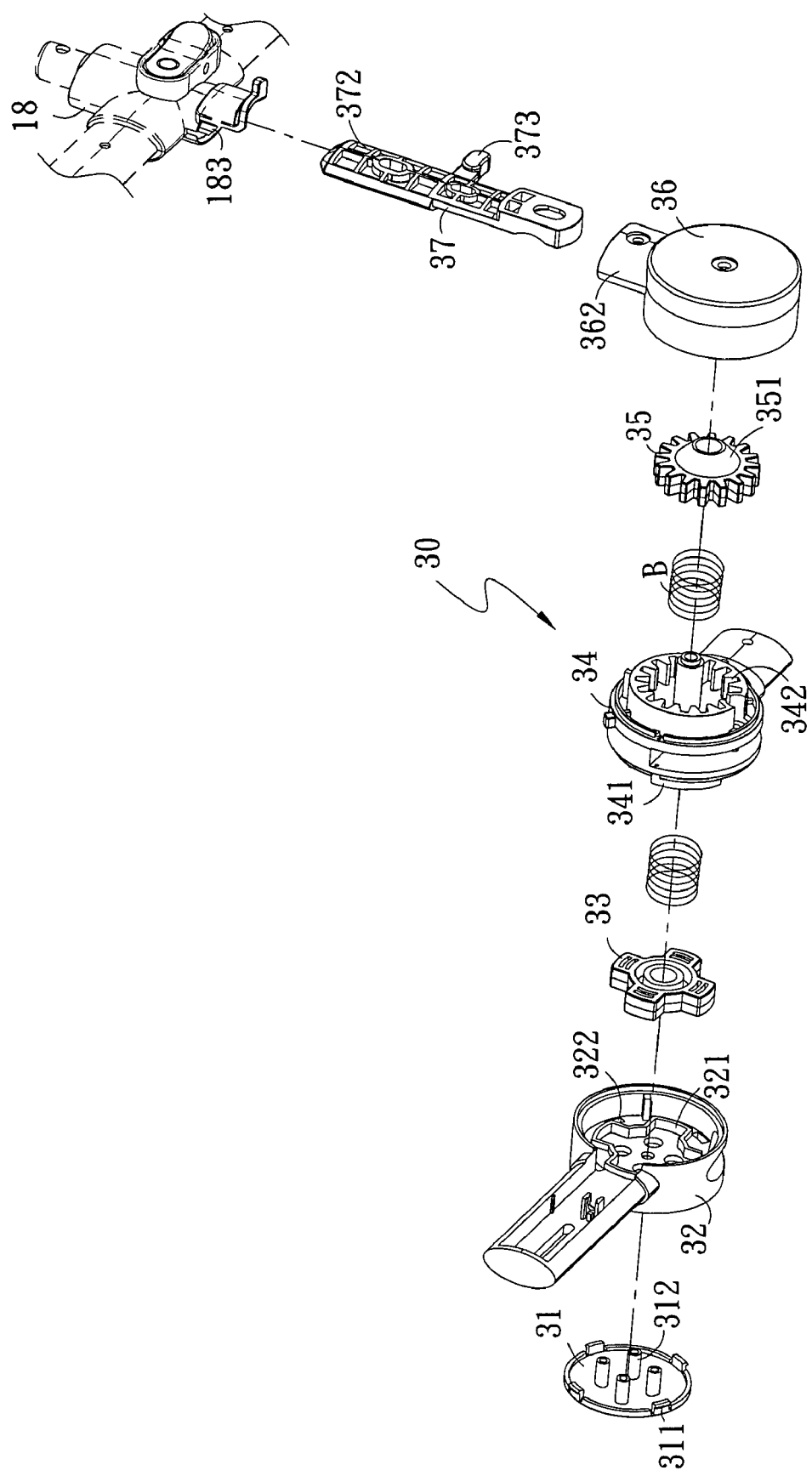
FIG. 5b is another exploded view of the first rotary joint of the invention.

Referring to FIGS. 5a and 5b, the first rotary joint 30 includes a first joint guarding cap 31, a first joint front cap 32, a cross latch member 33, a first joint holding member 34, a gear 35, a first joint rear cap 36, a pulling bar 37 and a plurality of elastic elements B. The first joint guarding cap 31 has a plurality of latch hooks 311 to latch the first joint front cap 32, and a plurality of thrust struts 312 to push the cross latch member 33. The first joint front cap 32 has an anchor trough 321 at one side to anchor the cross latch member 33, and a latch trough 322 at another side corresponding to the latch hooks 311. The first joint holding member 34 has a plurality of anchor struts 341 at one side to anchor the cross latch member 33 and a teeth trough 342 at another side to anchor the gear 35. The gear 35 has a conical member 351. The first joint rear cap 36 also has a teeth trough 361 at one side same as that of the first joint holding member 34, and a trough 362 at the top to receive the pulling bar 37. The pulling bar 37 has a conical surface 371 corresponding to the profile of the conical member 351 of the gear 35 and a first wedge strut 372 at another side to be inserted into the insertion cavity 183 of the cross coupling hub 18, and a pulling portion 373 in the middle.

Figure 8:
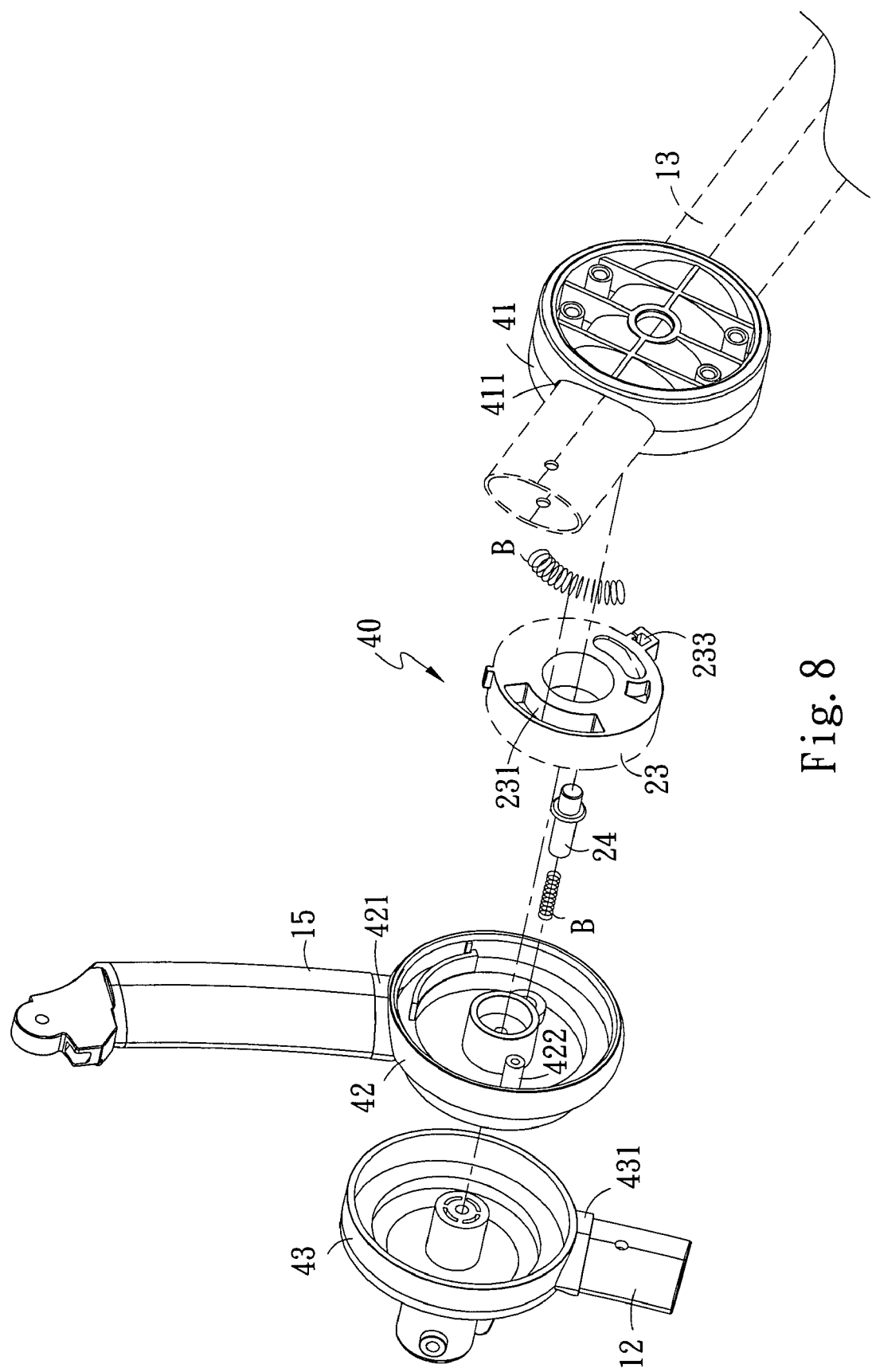
FIG. 8 is an exploded view of the second rotary joint of the invention.

Referring to FIG. 8, the second rotary joint 40 includes a second joint sliding member 41, a second joint rotary member 42, a second joint coupling member 43 and a plurality of elastic elements B. The second joint sliding member 41 has a first through hole 411 to receive the front wheel rack 13 so that the second rotary joint 40 can slide on the front wheel rack 13. The second joint rotary member 42 has a second wedge strut 421 to receive the connection bar 15 and an anchor strut 422 to be inserted into the slot 231 of the rotary latch member 23 of the sliding sleeve assembly 20. The second joint coupling member 43 has a third wedge strut 431 to be inserted in the rear wheel rack 12.

Figure 9:
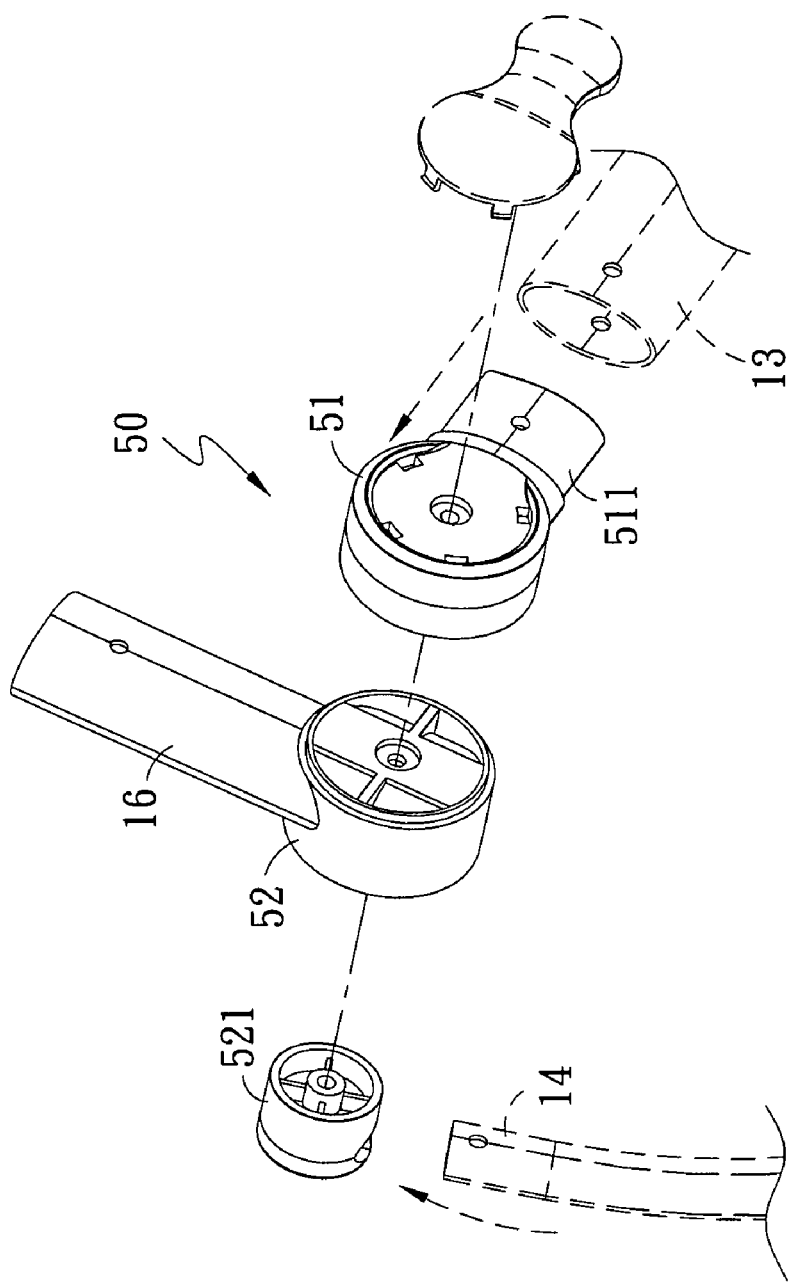
FIG. 9 is an exploded view of the third rotary joint of the invention.

Referring to FIG. 9, the third rotary joint 50 includes a third joint front cap 51 and a third joint holding member 52. The third joint front cap 51 has a fourth wedge strut 511 to be inserted in one end of the front wheel rack 13. The third joint holding member 52 has a strut 521 at one side to be inserted in one end of the arched rib 14, and with the bracing bar 16 located on the periphery.

Figure 10:
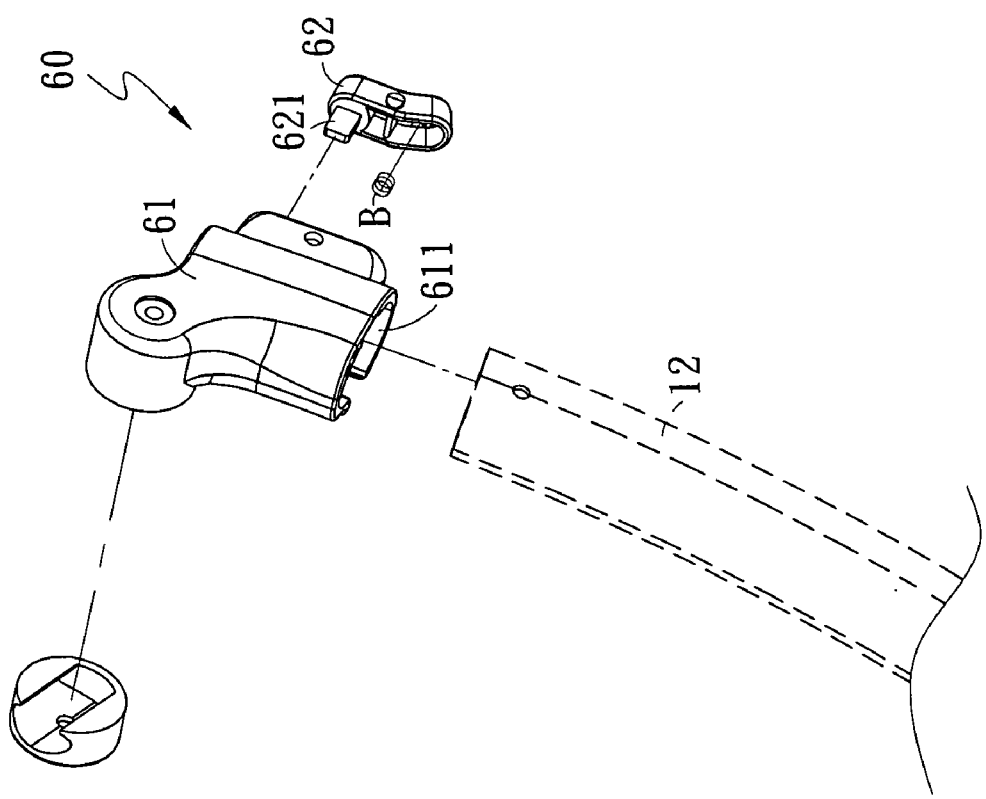
FIG. 10 is an exploded view of the fourth rotary joint of the invention.

Referring to FIG. 10, the fourth rotary joint 60 includes a fourth joint sliding member 61, a fourth joint anchor knob 62 and a plurality of elastic elements B. The fourth joint sliding member 61 has a second through hole 611 to receive the rear wheel rack 12 so that the fourth rotary joint 60 can slide on the rear wheel rack 12. The fourth joint anchor knob 62 has an insertion strut 621 to be inserted in the rear wheel rack 12 to anchor the fourth rotary joint 60.

Figure 12:
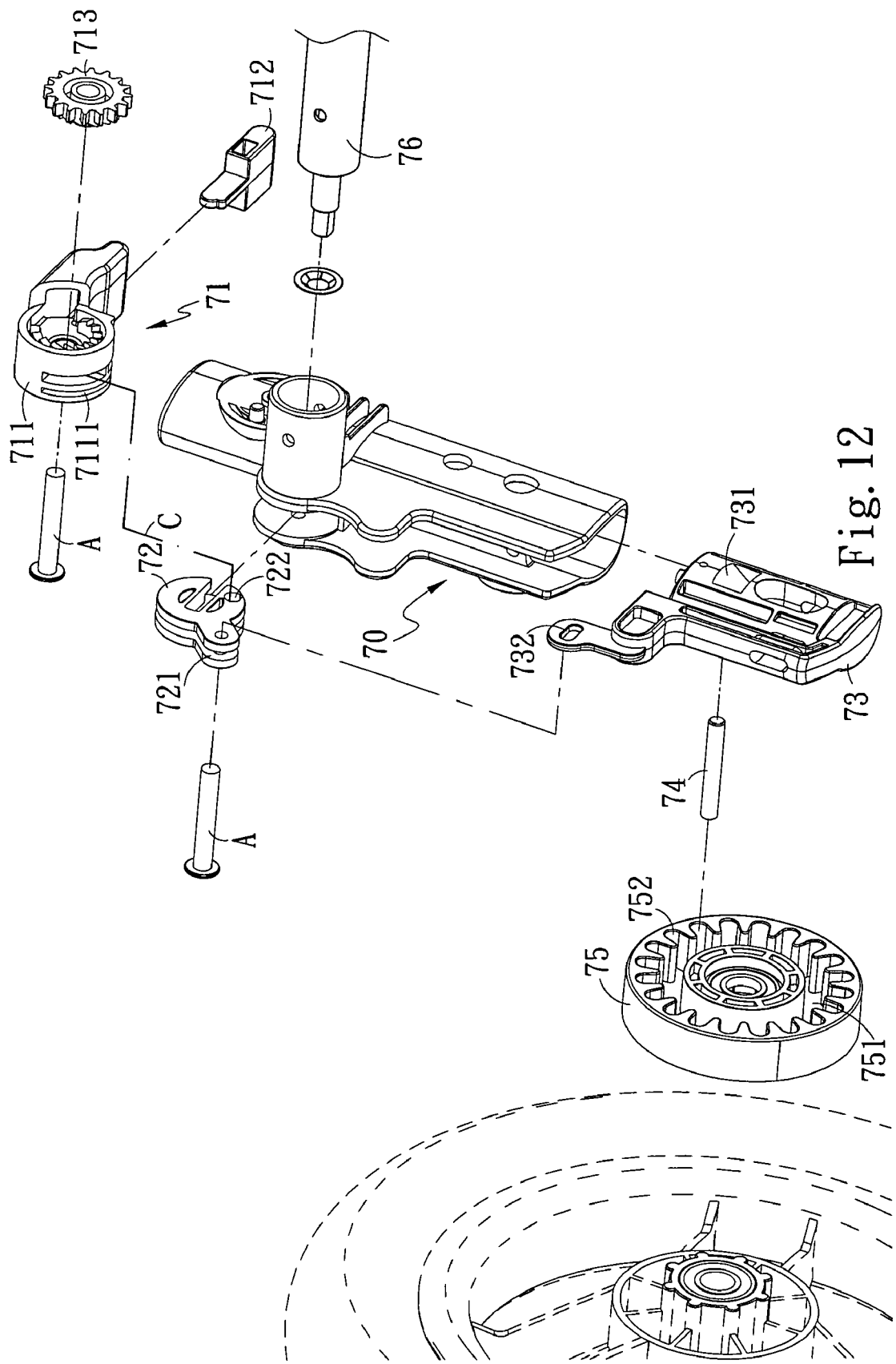
FIG. 12 is an exploded view of the brake means of the invention.
Figure 13A:
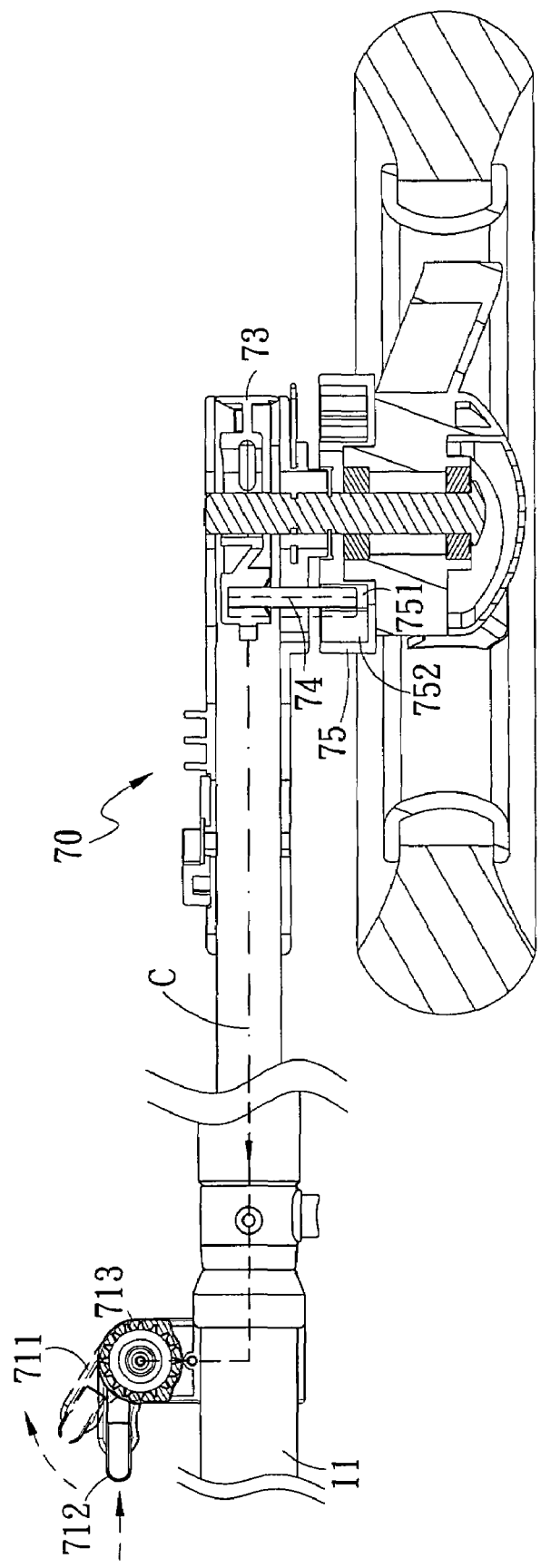
FIG. 13a is a plan view partly in cross-section view of the brake means of the invention in operating condition-2.
Figure 13B:
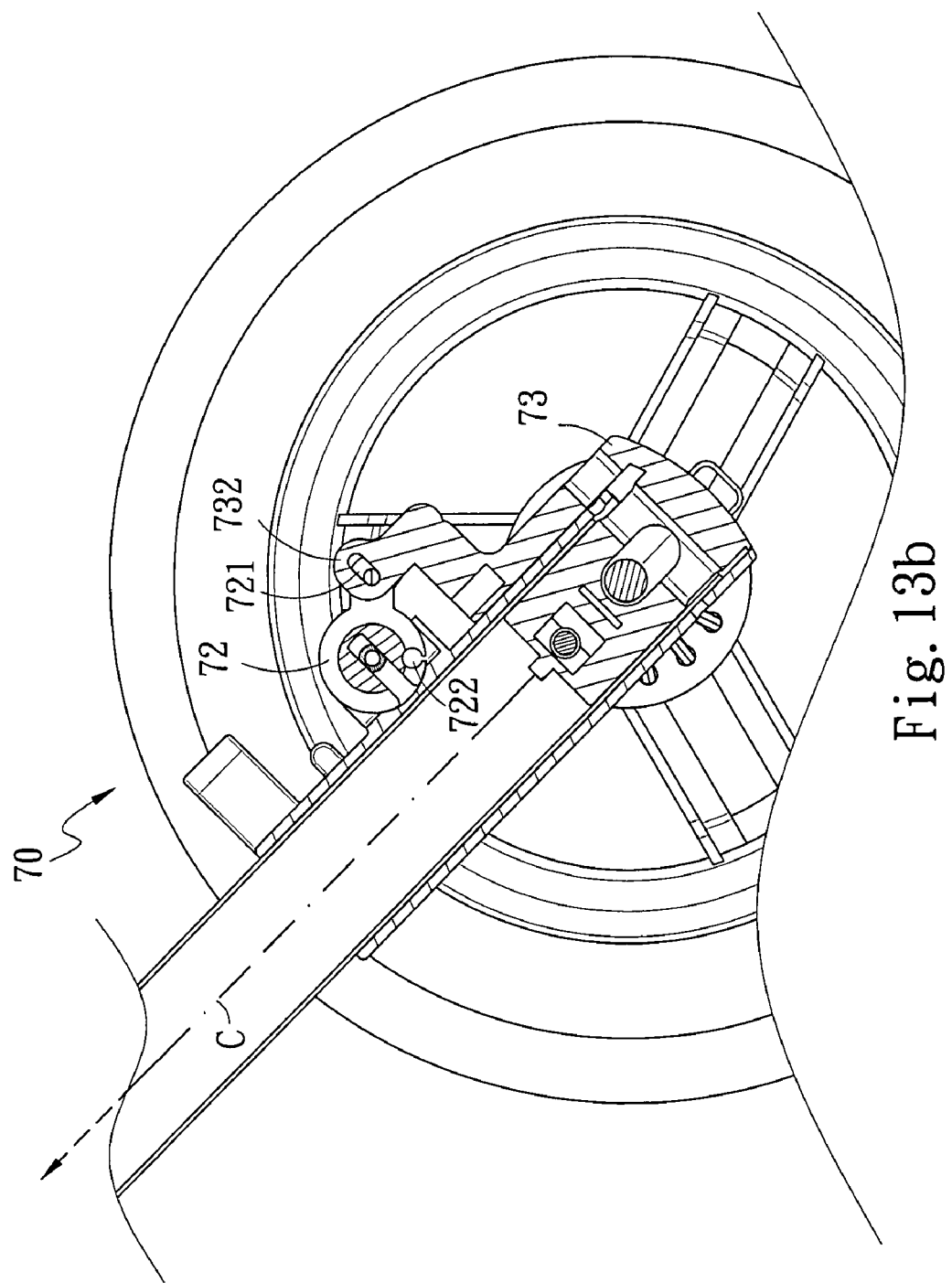
FIG. 13b is a plan view partly in cross-section view of the brake means of the invention in operating condition-2.
Figure 14:
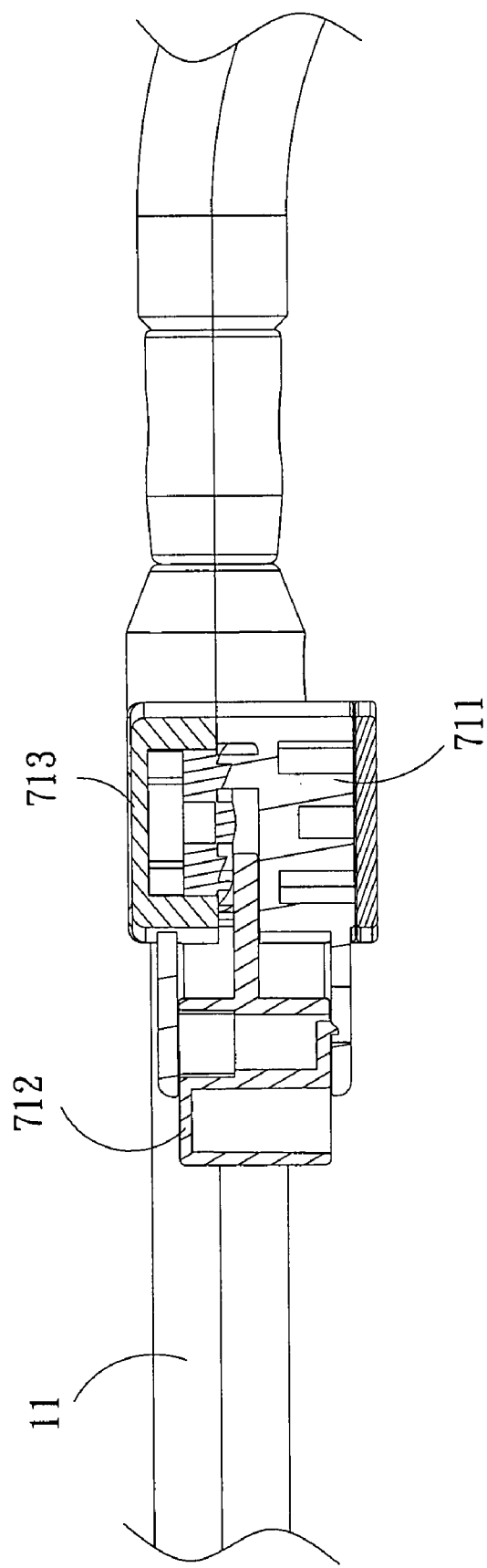
FIG. 14 is a plan view partly in cross-section view of the invention showing the brake button and coupling gear in an engaging condition.
Figure 15A:
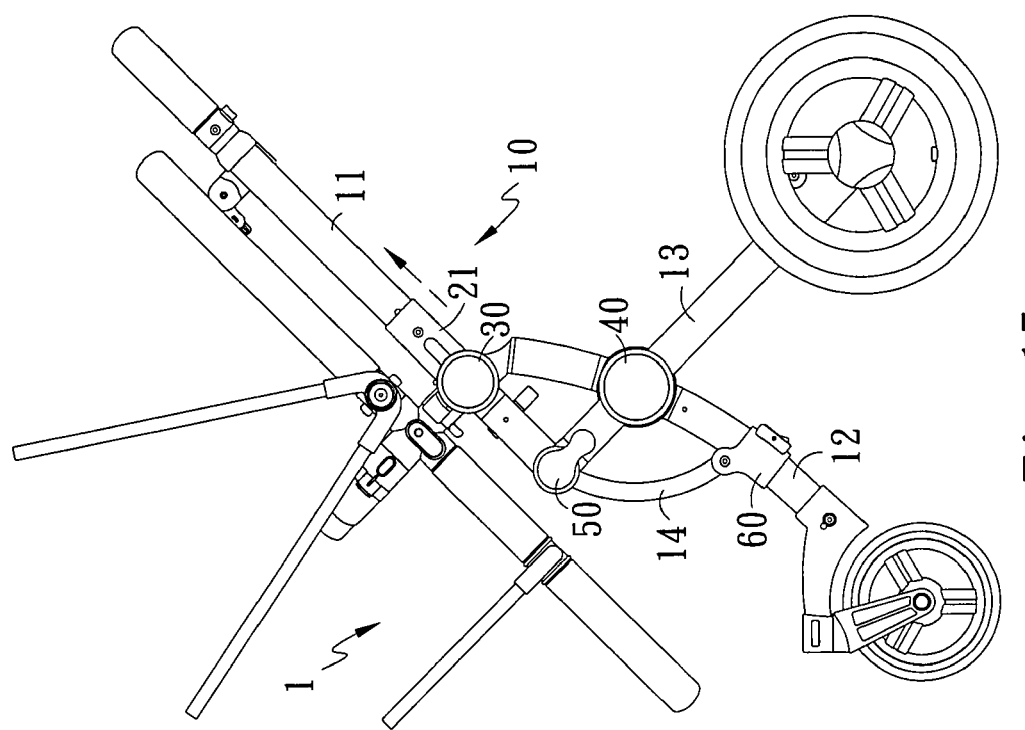
FIG. 15a is a plan view of the folding means of the invention in operating condition-1.
Figure 15B:
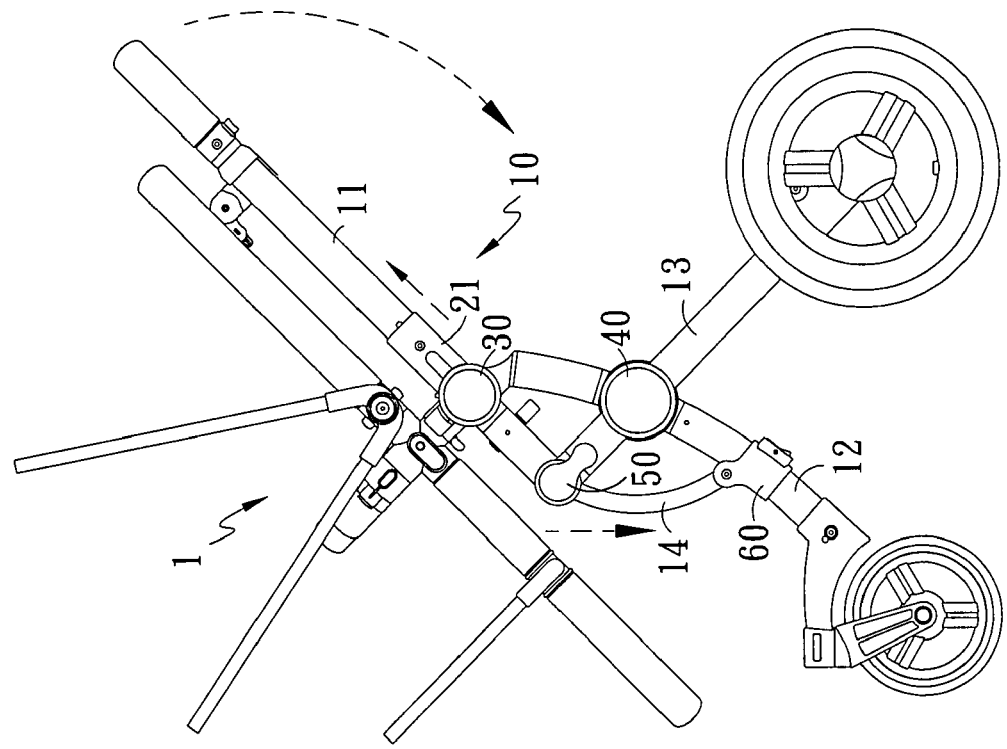
FIG. 15b is a plan view of the folding means of the invention in operating condition-2.
Figure 15C:
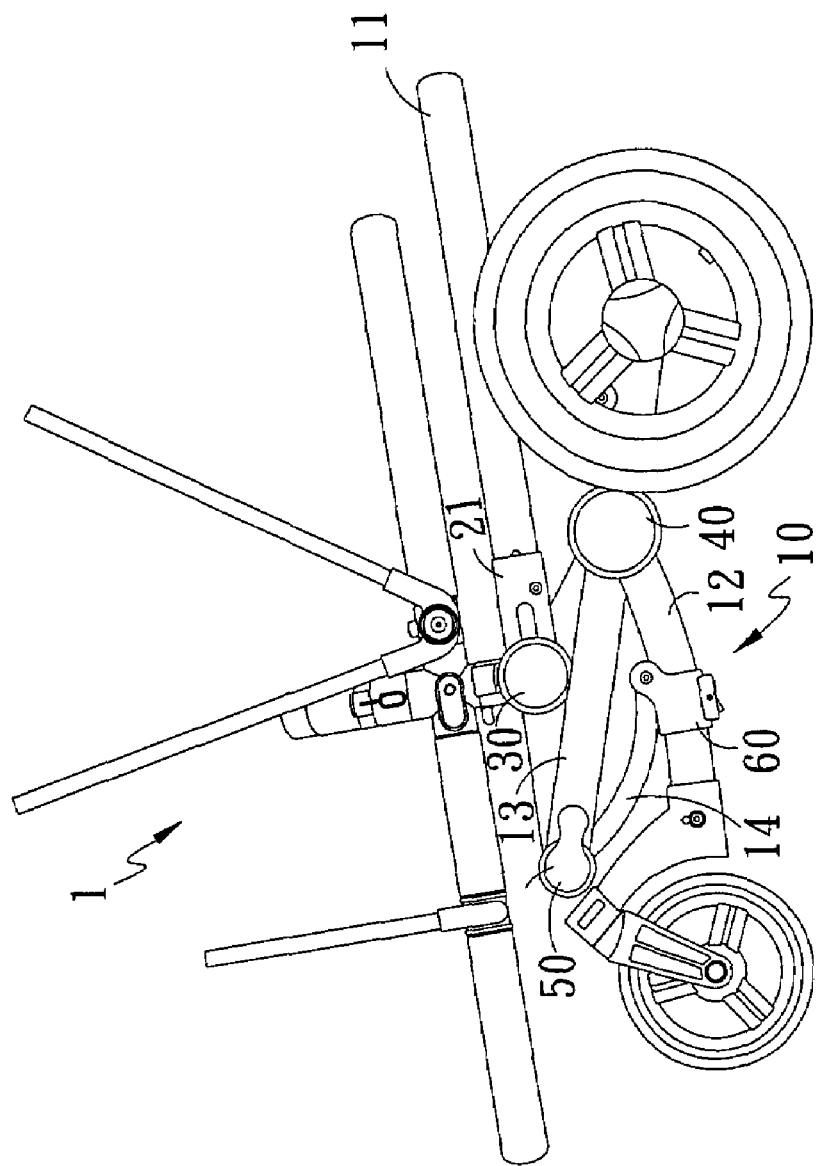
FIG. 15c is a schematic view of the folding means of the invention in operating condition-3.

Referring to FIG. 12, the brake means 70 includes a brake pulling bar assembly 71, the latch member 72, sliding seat 73, bucking strut 74, brake gear 75, sync bar 76, fastening elements A and cable C. The brake pulling bar assembly 71 includes a brake pulling bar 711, a brake pulling bar button 712 and a coupling gear 713. The brake pulling bar 711 has a third anchor trough 7111 to fasten one end of the cable C. The brake pulling bar button 712 is wedged in the brake pulling bar 711 mating the coupling gear 713 located in the brake pulling bar 711. Referring to FIG. 14, the latch member 72 has an anchor hole 721 to anchor an anchor aperture 732 formed on the sliding seat 73, and a fourth anchor trough 722 to fasten the other end of the cable C. The sliding seat 73 has a second slope surface 731 and the anchor aperture 732. The bucking strut 74 has one side wedged in the sliding seat 73 and another side wedged in a trough 751 of the brake gear 75. The brake gear 75 is located at one side of the front wheels and has the trough 751 and a plurality of stop ditches 752 at one side.

Referring to FIGS. 4, 15a, 15b and 15c, when the upper rack 11 is pushed downwards and the sliding sleeve 21 slides upwards, the sliding latch member 22 is driven to slide upwards; the cable C at one side of the sliding latch member 22 pulls one side of the rotary latch member 23 to form swiveling so that the return strut 24 at the inner side of the rotary latch member 23 is moved upwards through the first slope surface 232, and the return strut 24 is no longer wedged in the front wheel rack 13, and the second rotary joint 40 slides downwards and rotates to drive the arched rib 14 and the front wheel rack 13 to swivel between the third and fourth rotary joints 50 and 60; thereby the entire structure of the stroller 10 is retracted through the folding means 1.

Figure 6:
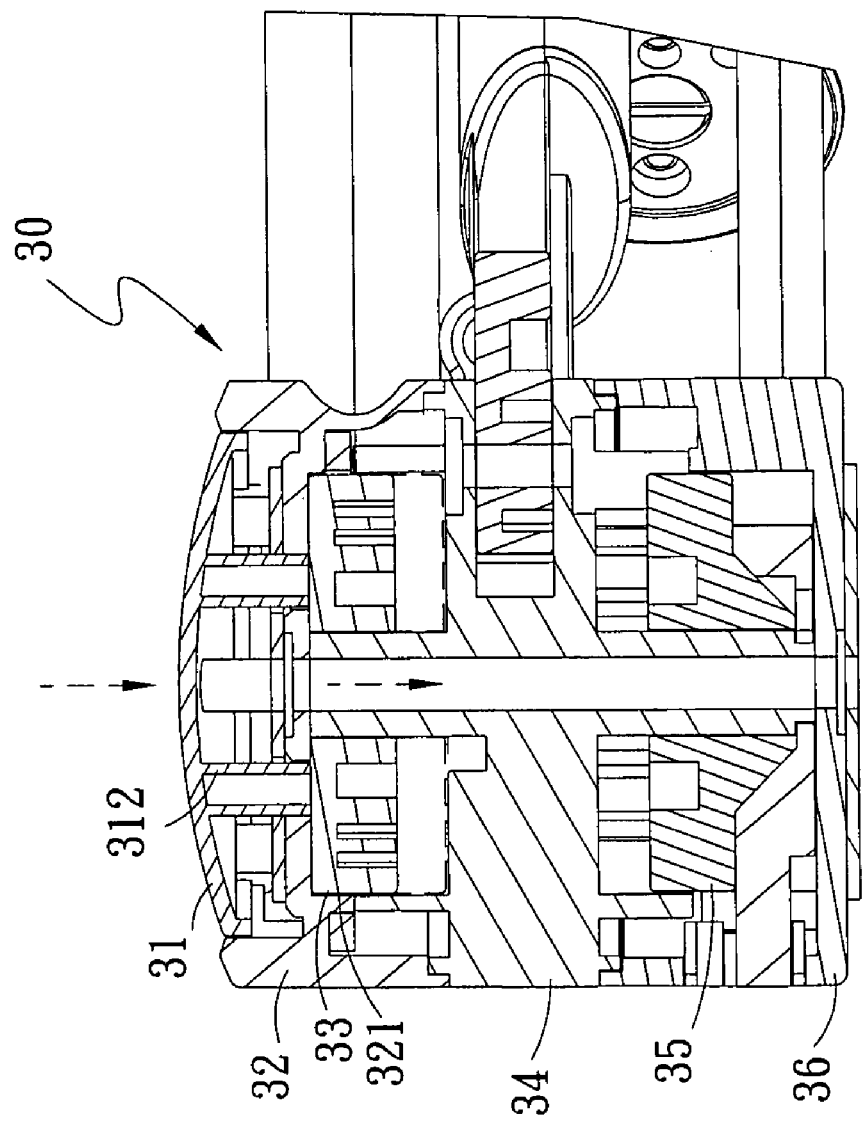
FIG. 6 is a cross-sectional view of the first rotary joint of the invention in an operating condition.
Figure 7A:
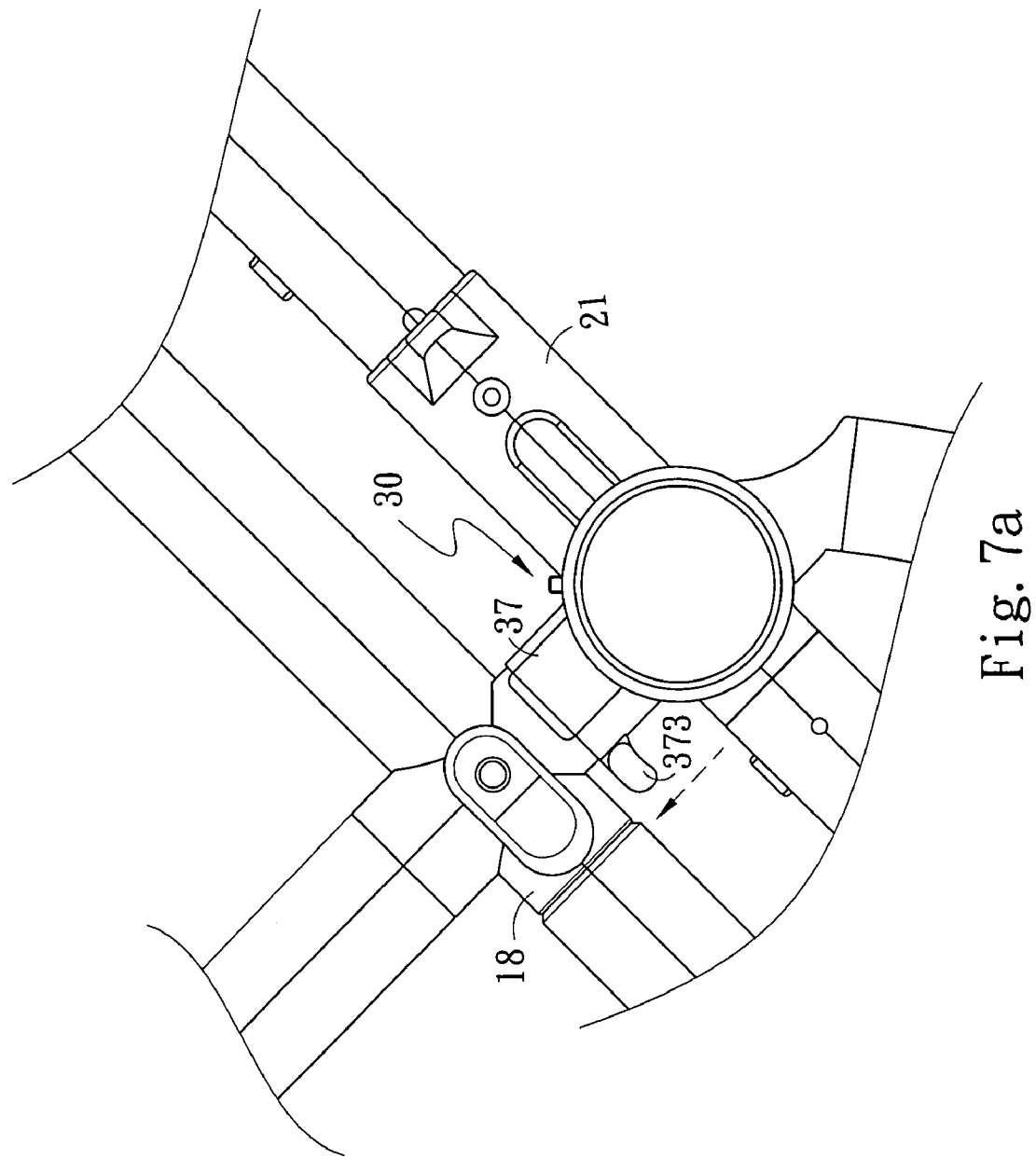
FIG. 7a is a plan view of the pulling bar of the first rotary joint of the invention in operating condition-2.
Figure 7B:
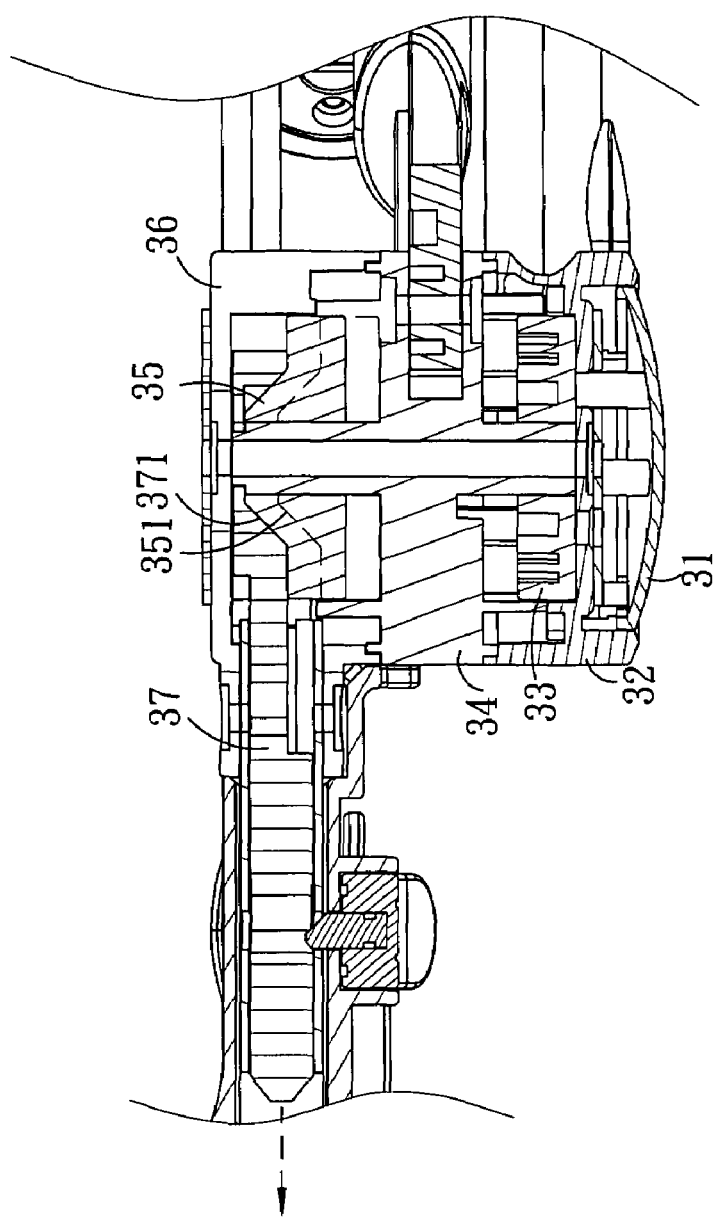
FIG. 7b is a cross-sectional view of the pulling bar of the first rotary joint of the invention in operating condition-2.
Figure 11:
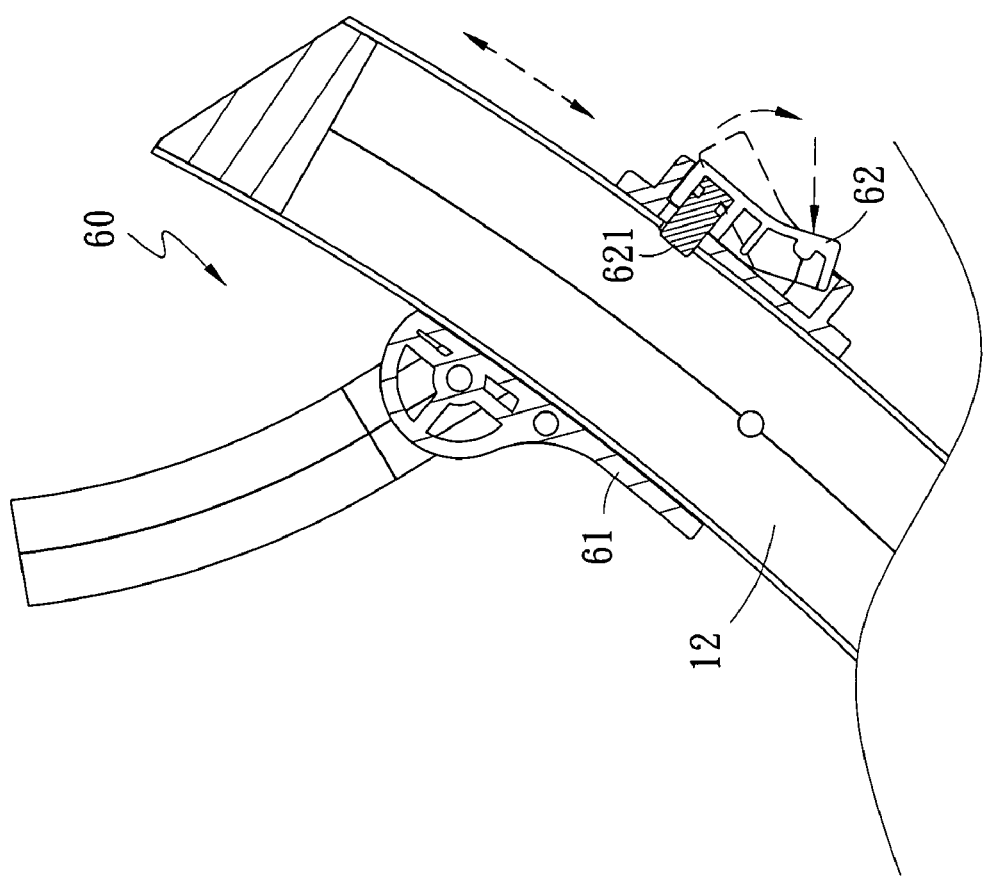
FIG. 11 is a plan view of the fourth rotary joint of the invention in an operating condition.
Figure 16A:
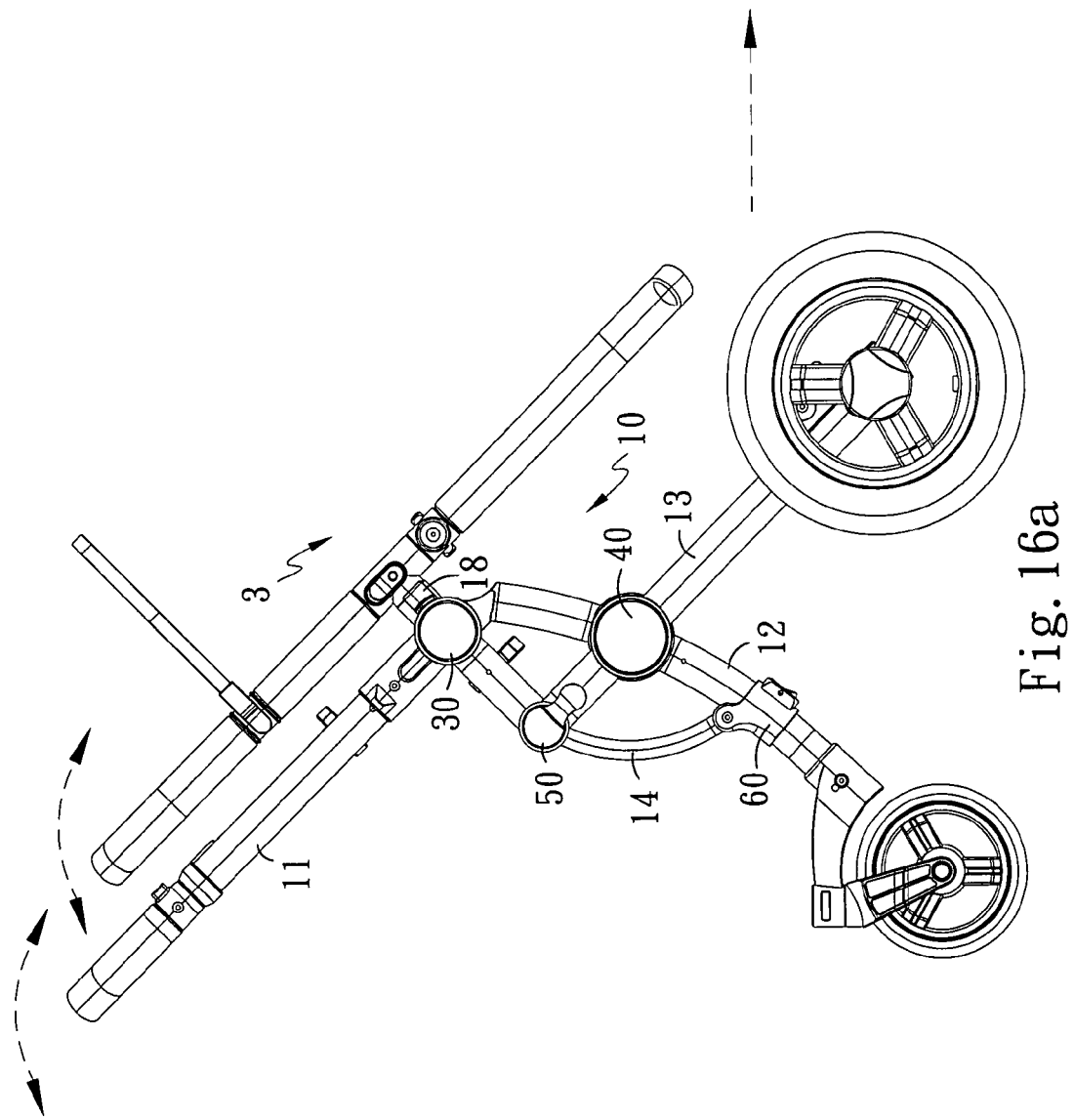
FIG. 16a is a plan view of the direction switch means of the invention in operating condition-1.
Figure 16B:
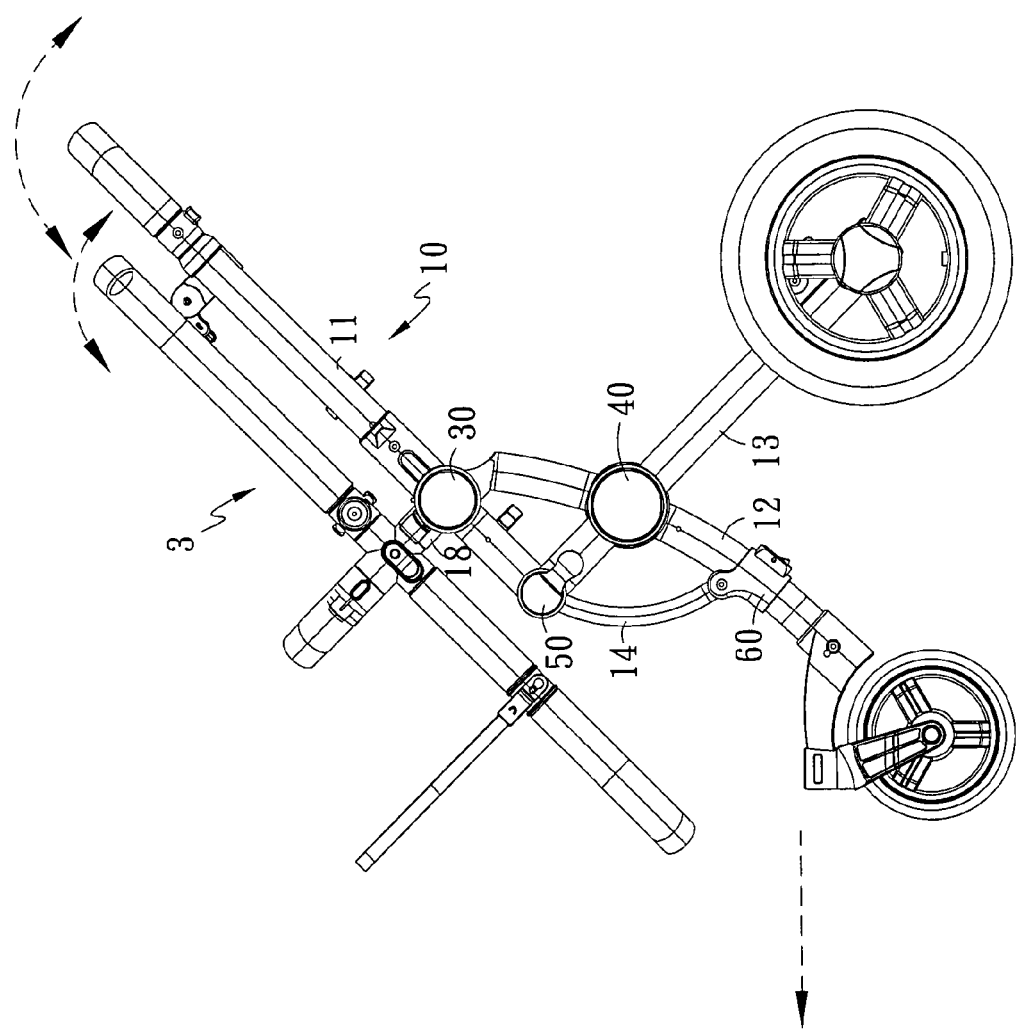
FIG. 16b is a plan view of the direction switch means of the invention in operating condition-2.
Figure 17:
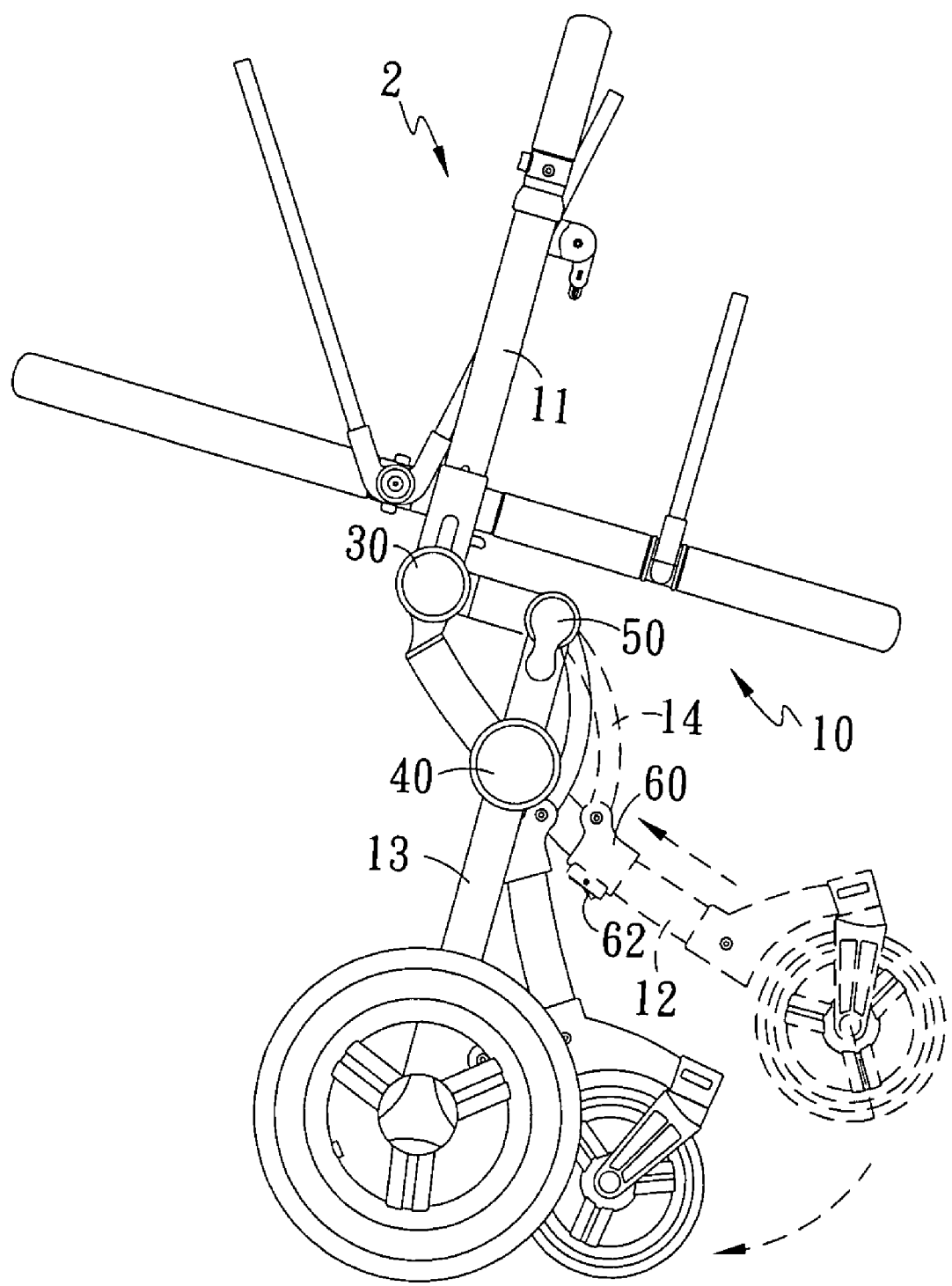
FIG. 17 is a plan view of the invention showing the wheels in a folding condition.

Referring to FIGS. 6, 7a and 7b, when the first joint guarding cap 31 is moved inwards, the thrust struts 312 push the cross latch member 33 inwards to escape the anchor trough 321 of the first joint front cap 32, and the first rotary joint 30 swivels to drive the upper rack 11 to switch direction. When the pulling portion 373 of the pulling bar 37 is pulled, the pulling bar 37 is moved upwards and the conical member 351 at one side of the gear 35 is moved inwards along the conical surface 371 to escape the teeth trough 361 of the first joint rear cap 36 so that the first rotary joint 30 and the pulling bar 37 swivel. The cross coupling hub 18 wedged in the pulling bar 37 also is swiveled to drive the entire seat assembly 3 to switch direction as shown in FIGS. 16a and 16b. Referring to FIG. 11, when one side of the fourth joint anchor knob 62 is depressed, the insertion strut 621 located at the inner side thereof escapes the rear wheel rack 12 so that the fourth joint sliding member 61 drives the fourth rotary joint 60 to slide on the rear wheel rack 12. In cooperation with swiveling of the anchor rib 14 and the rear wheel rack 12 on the second and third rotary joints 40 and 50, a wheel retraction system is formed. Coupling with the direction switch movement previously discussed, the function of the direction switch and wheel retraction means 2 can be accomplished as shown in FIG. 17.

Referring to FIGS., 12, 13a and 13b, when the brake pulling bar assembly 71 is pulled, through pulling of the cable C the latch member 72 is moved to drive the sliding seat 73, and one end of the bucking strut 74 of the sliding seat 73 is moved so that the other end originally located in the trough 751 of the brake gear 75 is moved to the stop ditch 752 to accomplish the function of the brake means 70. The sync bar 76 is connected to the latch member 72 and sliding seat 73 at two sides. Hence when any side of the bucking strut 74 is inserted into the brake gear 75 the left side and right side are actuated at the same time.

Referring to FIGS. 18a through 19d, the seat coupling struts 181 at two sides of the cross coupling hub 18 can hold the seat rack 19. By removing the fastening elements A the seat rack 19 can be removed. The round strut 182 at the head can hold the wedge cavity 1722 of the guarding handle 17. When the guarding handle 17 is inserted in the cross coupling hub 18, the elastic reed 1723 is inserted into the fastening hole 1821 of the round strut 182 to fasten the guarding handle 17 to the cross coupling hub 18. When there is a desire to open any side of the guarding handle 17, push the pushbutton 1724 of the guarding handle 17 to release the elastic reed 1723 from the fastening hole 1821 of the round post 182 of the cross coupling hub 18, the guarding handle 17 can be opened easily.

What is claimed is:

1. A stroller comprising at least a folding means, a direction switch and wheel retraction means, a brake means and a seat assembly, the folding means being located above the direction switch and wheel retraction means, the brake means being located below the direction switch and wheel retraction means, the seat assembly being located between the folding means and the direction switch and wheel retraction means, wherein: the folding means includes a sliding sleeve assembly, an upper rack, a bracing bar, a rear wheel rack, an arched rib, a second rotary joint, a third rotary joint and a fourth rotary joint; the upper rack having two ends coupled respectively with a first rotary joint and the sliding sleeve assembly, the first rotary joint being connected to one end of the bracing bar, the bracing bar having other end connecting to the third rotary joint, a front wheel rack having one side coupled with front wheels and another side connecting to the turnable third rotary joint, the arched rib having one side connecting to the third rotary joint and another side connecting to the fourth rotary joint which is turnable and slidable on a rear wheel rack;

the direction switch and wheel retraction means includes the rear wheel rack, the arched rib, the second rotary joint, the third rotary joint and the fourth rotary joint; the rear wheel rack having one side coupling with rear wheels and another side coupling with the second rotary joint which is turnable and slidable on the front wheel rack, the arched rib having one side connecting to the third rotary joint and another side connecting to the fourth rotary joint;

the brake means includes a brake pulling bar assembly, a latch member, a sliding seat, a bucking strut, a brake gear, a sync bar, a plurality of fastening elements and a cable; the brake pulling bar assembly being mounted onto the upper rack and connected to the latch member through the cable, the latch member being connected to the sliding seat through the fastening elements, the bucking strut being located in the sliding seat and wedged in the brake gear on the front wheels to accomplish braking effect; and the seat assembly includes a cross coupling hub, a guarding handle, a seat rack and the first rotary joint; the cross coupling hub being inserted in the first rotary joint, and the guarding handle and the seat rack being inserted in the cross coupling hub.

2. The stroller of claim 1, wherein the sliding sleeve assembly includes a sliding sleeve, a sliding latch member, a rotary latch member, a return strut, the cable and elastic elements; the sliding sleeve having a pin to be inserted in the sliding latch member so that the sliding sleeve and the sliding latch member slide at the same time, the sliding latch member having an aperture corresponding to the pin on the sliding sleeve and a first anchor trough to fasten one side of the cable;

the rotary latch member having a slot and a first slope surface to allow the return strut to be moved on an inner side of the rotary latch member, and a second anchor trough to fasten to the other side of the cable;

the return strut having a plane to hold an inner side of the rotary latch member, the rotary latch member and the return strut being located in the second rotary joint.

3. The stroller of claim 1, wherein the cross coupling hub has seat coupling struts at two sides to hold the seat rack and a round post to wedge in the guarding handle, the round post having a fastening hole and an insertion cavity at the bottom.

4. The stroller of claim 1, wherein the guarding handle has an axle and an insertion member at each of two sides thereof;

the insertion member having a turning portion corresponding to the axle and a wedge cavity and an elastic reed at an inner side thereof, the insertion member further having a pushbutton on one side.

5. The stroller of claim 1, wherein the first rotary joint includes a first joint guarding cap, a first joint front cap, a cross latch member, a first joint holding member, a gear, a first joint rear cap, a pulling bar and a plurality of elastic elements;

the first joint guarding cap having a plurality of latch hooks to latch the first joint front cap and a plurality of thrust struts to push the cross latch member;

the first joint front cap having an anchor trough at one side to anchor the cross latch member, and a latch trough at another side corresponding to the latch hooks;

the first joint holding member having an anchor strut at one side to anchor the cross latch member and a teeth trough at another side to anchor the gear;

the gear having a conical member, the first joint rear cap having another teeth trough same as that of the first joint holding member and a trough at the top to receive the pulling bar;

the pulling bar having a conical surface at one side corresponding to the profile of the conical member of the gear and a first wedge strut at another side to be inserted in an insertion hole of the cross coupling hub and a pulling portion in the middle thereof.

6. The stroller of claim 1, wherein the second rotary joint includes a second joint sliding member, a second joint rotary member, a second joint coupling member and a plurality of elastic elements;

the second joint sliding member having a first through hole to be coupled on the front wheel rack so that the second rotary joint is slidable on the front wheel rack;

the second joint rotary member having a second wedge strut to receive the connection bar and an anchor strut to insert into the slot of the rotary latch member of the sliding sleeve assembly;

the second joint coupling member having a third wedge strut inserted in the rear wheel rack.

7. The stroller of claim 1, wherein the third rotary joint includes a third joint front cap and a third joint holding member;

the third joint front cap having a fourth wedge strut to be inserted in one end of the front wheel rack;

the third joint holding member having a strut at one side to be inserted by one end of the arched rib and the periphery thereof coupled with the bracing bar.

8. The stroller of claim 1, wherein fourth rotary joint includes a fourth joint sliding member, a fourth joint anchor knob and a plurality of elastic elements;

the fourth joint sliding member having a second through hole to be coupled on the rear wheel rack so that the fourth rotary joint is slidable on the rear wheel rack;

the fourth joint anchor knob having an insertion strut to be inserted in the rear wheel rack to anchor the fourth rotary joint.

9. The stroller of claim 1, wherein the brake means includes a brake pulling bar assembly, a latch member, a sliding seat, a bucking strut, a brake gear, a plurality of fastening elements and a cable; the latch member having an anchor hole to anchor an anchor hole formed on the sliding seat and a fourth anchor trough to fasten other end of the cable;

the sliding seat having a second slope surface and a anchor aperture;

the bucking strut having one side wedged in the sliding seat and another side wedged in a trough of the brake gear;

the brake gear being located at one side of the front wheels and has the trough and a plurality of stop ditches at one side.

10. The stroller of claim 1, wherein the cable is a flexible wire.

11. The stroller of claim 1, wherein the cable is a rigid wire.

12. The stroller of claim 1, wherein the elastic elements are springs.

13. The stroller of claim 1, wherein the fastening elements are rivets.

14. The stroller of claim 1, wherein the fastening elements are screws.

15. The stroller of claim 9, wherein the brake pulling bar assembly includes a brake pulling bar, a brake pulling bar button and a coupling gear;

the brake pulling bar having a third anchor trough to fasten one end of the cable;

the brake pulling bar button being wedged in the brake pulling bar mating a coupling gear located on the brake pulling bar.

16. The stroller of claim 9, wherein the sync bar is connected to the latch member and the sliding seat at two sides such that when any side of the bucking strut is inserted into the brake gear the left side and right side thereof are actuated at the same time.

* * * * *